(12) United States Patent
Kubota

(10) Patent No.: US 9,115,440 B2
(45) Date of Patent: Aug. 25, 2015

(54) METHOD FOR FORMING MULTILAYER COATING FILM AND COATED ARTICLE

(75) Inventor: Kentaro Kubota, Kanagawa (JP)

(73) Assignee: KANSAI PAINT CO., LTD., Amagasaki-shi (JP)

(*) Notice: Subject to any disclaimer, the term of this patent is extended or adjusted under 35 U.S.C. 154(b) by 1478 days.

(21) Appl. No.: 12/285,977

(22) Filed: Oct. 17, 2008

(65) Prior Publication Data
US 2009/0101512 A1 Apr. 23, 2009

(30) Foreign Application Priority Data

Oct. 17, 2007 (JP) ................................. 2007-269756
Nov. 26, 2007 (JP) ................................. 2007-304137

(51) Int. Cl.
*C25D 5/34* (2006.01)
*C08G 18/28* (2006.01)
*C08G 18/64* (2006.01)
(Continued)

(52) U.S. Cl.
CPC ............... *C25D 5/34* (2013.01); *C08G 18/283* (2013.01); *C08G 18/643* (2013.01); *C08G 18/8064* (2013.01); *C08G 18/8077* (2013.01); *C08G 59/184* (2013.01); *C09D 5/4434* (2013.01); *C09D 171/02* (2013.01); *C23C 22/13* (2013.01); *C23C 22/34* (2013.01); *C23C 22/83* (2013.01); *C25D 5/10* (2013.01); *C25D 13/18* (2013.01); *C25D 13/20* (2013.01); *C08G 2650/50* (2013.01); *C08L 63/00* (2013.01)

(58) Field of Classification Search
CPC ............ C25D 5/34; C25D 5/10; C25D 13/18; C25D 13/20; C08G 18/283; C08G 18/643; C08G 18/8064; C08G 18/8077; C08G 59/184; C08G 2650/50; C08L 63/00; C09D 5/4434; C09D 171/02; C23C 22/13; C23C 22/34; C23C 22/83
USPC ......................................... 204/486, 502, 505
See application file for complete search history.

(56) References Cited

U.S. PATENT DOCUMENTS 4,457,790 A 7/1984 Lindert et al.
4,659,800 A * 4/1987 Daimer et al. ................ 528/103
(Continued)

FOREIGN PATENT DOCUMENTS

JP 59-207972 11/1984
JP 06-025567 2/1994
(Continued)

*Primary Examiner* — Kishor Mayekar
(74) *Attorney, Agent, or Firm* — Kratz, Quintos & Hanson, LLP

(57) ABSTRACT

An object of the present invention is to provide a coated article having excellent finish and corrosion resistance unaffected by a chemical conversion coating solution even if water washing after a pretreatment step is omitted and a pretreatment solution is carried as a contaminant into an electrodeposition coating composition. The present invention provides a method for forming a multilayer coating film comprising a chemical conversion coating film (F1) and an electrodeposition coating film (F2); the method comprising the following steps. Step 1: immersing a metal substrate in a coating film forming agent (1) as a chemical conversion coating solution to form a chemical conversion coating film (F1); and Step 2: without water washing, subjecting the metal substrate to electrodeposition coating using a coating film forming agent (2) as a cationic electrodeposition coating composition (I) to form an electrodeposition coating film (F2).

6 Claims, 2 Drawing Sheets

(51) Int. Cl.

| | |
|---|---|
| *C08G 18/80* | (2006.01) |
| *C08G 59/18* | (2006.01) |
| *C09D 5/44* | (2006.01) |
| *C09D 171/02* | (2006.01) |
| *C23C 22/13* | (2006.01) |
| *C23C 22/34* | (2006.01) |
| *C23C 22/83* | (2006.01) |
| *C25D 5/10* | (2006.01) |
| *C25D 13/18* | (2006.01) |
| *C25D 13/20* | (2006.01) |
| *C08L 63/00* | (2006.01) |

(56) References Cited

U.S. PATENT DOCUMENTS

| | | | |
|---|---|---|---|
| 6,168,868 B1 * | 1/2001 | Hauser et al. | 428/457 |
| 7,497,936 B2 * | 3/2009 | Eswarakrishnan et al. | 204/501 |
| 2001/0012564 A1 | 8/2001 | Nishiguchi et al. | |
| 2003/0221964 A1 | 12/2003 | Kasahara et al. | |
| 2007/0012569 A1 | 1/2007 | Mihara et al. | |

FOREIGN PATENT DOCUMENTS

| | | |
|---|---|---|
| JP | 08-092508 A | 4/1996 |
| JP | 10-324997 A | 12/1998 |
| JP | 2001-279168 A | 10/2001 |
| JP | 2003-012764 A | 1/2003 |
| JP | 2003-155578 | 5/2003 |
| JP | 2003-253461 | 9/2003 |
| JP | 2003-328192 | 11/2003 |
| JP | 2004-307776 | 11/2004 |
| JP | 2004-307871 | 11/2004 |
| JP | 2005-002370 | 1/2005 |
| JP | 2006-028543 | 2/2006 |
| JP | 2006-028579 | 2/2006 |
| JP | 2006-045560 | 2/2006 |
| JP | 2006-169471 | 6/2006 |
| JP | 2006-239622 | 9/2006 |
| JP | 2006-342239 | 12/2006 |
| JP | 2007-246806 | 9/2007 |
| WO | 02/103080 | 12/2002 |
| WO | 2006/109862 | 10/2006 |

* cited by examiner

METHOD FOR FORMING MULTILAYER COATING FILM AND COATED ARTICLE

CROSS-REFERENCE TO RELATED APPLICATIONS

None

FIELD OF THE INVENTION

This invention relates to a method for forming a multilayer coating film that enables a coated article excellent in finish and corrosion resistance to be obtained unaffected by a chemical conversion coating solution even if washing after chemical conversion treatment is omitted and chemical conversion coating solution is carried as a contaminant into the electrodeposition coating composition in the succeeding coating step, and to a coated article obtained using the method for forming a coating film.

BACKGROUND ART

Metal substrates for industrial use have heretofore been subjected to a phosphate treatment as a surface preparation for enhancing corrosion resistance and adhesion. In chemical conversion treatment using a phosphate treatment agent, however, the agent contains large amounts of phosphorous and nitrogen, and also contains large amounts of nickel, manganese and other heavy metals for enhancing the performance of the formed chemical conversion film. This leads to problems with respect to impact on the environment, as well as from the aspect of industrial waste treatment owing to the generation of large quantities of post-treatment sludge containing zinc phosphate, iron phosphate and the like.

Further, as shown in FIG. 1, in order to improve the corrosion resistance of metal substrates for industrial use, the coating line includes numerous steps such as "degreasing—surface conditioning and chemical conversion treatment—water washing—electrodeposition coating—UF washing—pure water washing—baking-drying," thus requiring much space and time.

Japanese Unexamined Patent Publication No. 2003-155578 teaches a chemical conversion treatment agent for iron- and/or zinc-based substrates that contains zirconium ions and/or titanium ions as well as fluorine ions and is substantially free of phosphate ions. However, treatment using the chemical conversion treatment agent for iron- and/or zinc-based substrates taught by this publication has a drawback in that it must be followed by application of a coating because without such a coating it is impossible to achieve adequate corrosion resistance and finish.

WO 02/103080 teaches that use of a metal surface treatment composition including (I) a compound containing at least one metal element selected from among Ti, Zr, Hf and Si and (II) a fluorine-containing compound serving as a supply source of fluorine ions makes it possible to deposit a surface treatment coating excellent in corrosion resistance on a metal surface containing at least one of iron and zinc and further to eliminate the need for a surface conditioning step, thereby streamlining the treatment steps and saving space.

Japanese Unexamined Patent Publication No. 2003-253461 teaches a metal surface treatment composition for iron-based substrates that contains zirconium ions and/or titanium ions and fluorine ions, as well as soluble epoxy resin, is substantially free of phosphate ions, and has a pH of 2.5 to 4.5.

Japanese Unexamined Patent Publication No. 2005-2370 teaches a surface treatment method for aluminum-based substrates, the method comprising the steps of (1) forming a chemical conversion coating film on an aluminum-based substrate surface by the chemical conversion reaction of a chemical conversion agent comprising a fluorine- and zirconium-containing compound, and (2) forming a hydrophilic coating using a hydrophilizing agent, the method being characterized in that the chemical conversion reaction conducts chemical conversion by electrolysis.

However, WO 02/103080 and Japanese Unexamined Patent Publication Nos. 2003-253461 and 2005-2370 also have the problem of not being able to achieve adequate corrosion resistance and finish unless a coating is applied following the treatment with the surface treatment composition taught thereby.

Japanese Unexamined Patent Publication No. 2006-28543 teaches a precoating process characterized in that after subjecting the article to be processed to degreasing and washing, a chemical conversion coating solution is applied without conducting surface conditioning and thereafter electrodeposition coating is performed without carrying out industrial water washing or drying of the treated article, the process being further characterized in that the chemical conversion coating solution may contain zirconium ions. On pages 4 to 5 of the specification, it is stated that the low pH of the chemical conversion coating solution makes a "water washing step" necessary between the chemical conversion step and the electrodeposition coating step, for preventing rusting.

Japanese Unexamined Patent Publication No. 2006-28579 teaches a precoating process characterized in that the article to be processed is treated by immersing it in the chemical conversion coating solution in a chemical conversion treatment tank in which an oil-adsorbent resin mass is floated, the process being further characterized in that the chemical conversion coating solution may contain zirconium ions. Moreover, paragraph 0034 of the specification states that no "washing process" using industrial water is necessary following the chemical conversion step.

However, when the precoating process of Japanese Unexamined Patent Publication No. 2006-28579 employing a chemical conversion coating solution with a resin floated thereon is used to form a coating and electrodeposition coating is then carried out without water washing, the chemical conversion coating solution is carried into the electrodeposition coating composition tank, so that the finish and corrosion resistance of the obtained coating film are unsatisfactory. Improvement has therefore been desired.

Japanese Unexamined Patent Publication No. 2006-239622 teaches a coating method that comprises the step of applying a water-base coating composition capable of forming, on a metal substrate not subjected to chemical conversion treatment, a coating having performance comparable to that of a coating including a chemical conversion coating film, which water-base coating composition contains, as appropriate, a water-dispersible epoxy resin and/or an anticorrosion pigment having a solubility of 0.001 to 5% in water. However, the method does not provide sufficient corrosion resistance.

WO 2006/109862 teaches a method for forming a coating film using an aqueous coating composition containing rare earth metals (Ce, Y, Nd, Pr, Yb) and, as appropriate, copper and/or zinc, and also containing a cationic resin; in which method a first layer is deposited in a pretreatment step at not greater than 50 V and a second layer is deposited at 50 to 450 V; the use of the aqueous coating composition enabling integration of the pretreatment step and the electrodeposition coating step. However, the coating film obtained using the aqueous coating composition set out in WO 2006/109862 is insufficient in corrosion resistance and particularly in long-term corrosion resistance properties such as weathering corrosion resistance.

DISCLOSURE OF THE INVENTION

An object of the present invention is to provide a method for forming a coating film that enables process streamlining and space saving, and to provide a coated article that is excellent in finish and corrosion resistance and whose electrodeposition coatability and coating properties are unaffected even if water washing after chemical conversion treatment is omitted and the chemical conversion coating solution is carried as a contaminant into the electrodeposition coating composition in the succeeding electrodeposition coating step.

Another object of the present invention is to find out a process that enables process streamlining and space saving, so as to innovate a method for forming a coating film capable of achieving excellent finish of the coating film forming agent and excellent corrosion resistance of the coating film and provide a coated article excellent in corrosion resistance.

The inventors carried out extensive research from which they found that the aforesaid object is achieved by a coating film forming method in which a metal substrate is immersed in a coating film forming agent (1) as a chemical conversion coating solution to form a chemical conversion coating film (1) and, without water washing, a specific cationic electrodeposition coating composition (I) is electrodeposited onto the metal substrate having the chemical conversion coating film formed thereon to form an electrodeposition coating film (2); and a multilayer coating film obtained by a method of coating a metal substrate under specific conditions using two successive coating film forming agent tanks (1) (first tank) and (2) (second tank) each containing a specific coating film forming agent. The inventors accomplished the present invention based on these findings.

The present invention provides the following method for forming a multilayer coating film, and coated article.

Item 1. A method for forming a multilayer coating film comprising a chemical conversion treatment coating film (F1) and an electrodeposition coating film (F2), the method comprising the following steps:

Step 1: immersing a metal substrate in a coating film forming agent (1) as a chemical conversion coating solution to form a chemical conversion coating film (F1); and Step 2: without water washing, electrodepositing a coating film forming agent (2) as a cationic electrodeposition coating composition (I) onto the metal substrate to form an electrodeposition coating film (F2).

Item 2. A method for forming a multilayer coating film according to Item 1, wherein the coating film forming agent (1) comprises 30 to 20,000 ppm, as a total metal quantity (on a mass basis), of at least one metal compound component (M) comprising a compound of at least one metal (m) selected from the group consisting of zirconium, titanium, cobalt, vanadium, tungsten, molybdenum, copper, zinc, indium, bismuth, yttrium and lanthanide metals, and 0.1 to 40 mass % of a water-dispersible or water-soluble resin composition (B).

Item 3. A method for forming a multilayer coating film according to Item 1, wherein the coating film forming agent (2) comprises an amino group-containing modified epoxy resin (A) and a blocked polyisocyanate, the amount of the amino group-containing modified epoxy resin (A) being 40 to 90 mass %, and preferably 50 to 90 mass %, and the amount of the blocked polyisocyanate being 10 to 60 mass %, and preferably 10 to 50 mass %, based on the total solid content mass of the cationic resin composition and blocked polyisocyanate.

Item 4. A method for forming a multilayer coating film according to Item 1, wherein the cationic electrodeposition coating composition (I) contains 40 to 80 mass % of an amino group-containing modified epoxy resin (A) based on the total solid content of the resin component constituting the cationic electrodeposition coating composition, and the amino group-containing modified epoxy resin (A) contains 3 to 50 mass % of a poly(oxyalkylene) chain represented by Formula (1) based on the resin solid content of the resin (A)

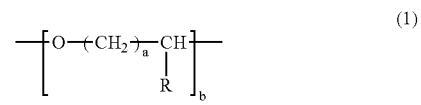

where Rs in the b-number of repeating units may be the same or different, each R represents a hydrogen atom or a $C_{1-6}$ alkyl group, a represents an integer from 1 to 8, and b represents an integer from 1 to 50.

Item 5. A method for forming a multilayer coating film according to Item 4, wherein the amino group-containing modified epoxy resin (A) is obtained by carrying out a reaction using a poly(oxyalkylene) (a11) represented by Formula (2) as a reaction constituent

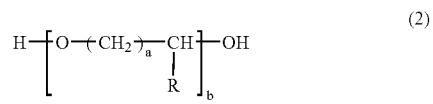

where Rs in the b-number of repeating units may be the same or different, each R represents a hydrogen atom or a $C_{1-6}$ alkyl group, a represents an integer from 1 to 8, and b represents an integer from 1 to 50.

Item 6. A method for forming a multilayer coating film according to Item 4, wherein the amino group-containing modified epoxy resin (A) is obtained by carrying out a reaction using a (poly)oxyalkylene adduct (a12) of bisphenol A represented by Formula (3) as a reaction constituent

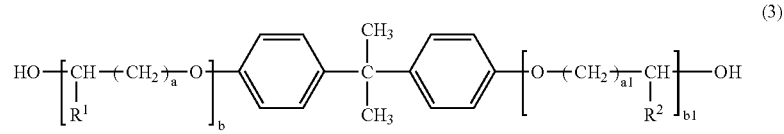

where $R^1$s and $R^2$s in the b-number and b1-number of repeating units may be the same or different, $R^1$ and $R^2$ each represent a hydrogen atom or a $C_{1-6}$ alkyl group, a and a1 each represent an integer from 1 to 8 which may be the same or different, and b and b1 each represent an integer from 1 to 50 which may be the same or different.

Item 7. A method for forming a multilayer coating film according to Item 4, wherein the amino group-containing modified epoxy resin (A) is obtained by carrying out a reaction using a poly(oxyalkylene)diglycidyl ether (a13) represented by Formula (4) as a reaction constituent

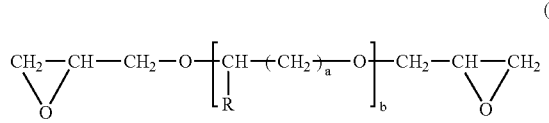
(4)

where Rs in the b-number of repeating units may be the same or different, each R represents a hydrogen atom or a $C_{1-6}$ alkyl group, a represents an integer from 1 to 8, and b represents an integer from 1 to 50.

Item 8. A method for forming a multilayer coating film according to Item 4, wherein the amino group-containing modified epoxy resin (A) is obtained by carrying out a reaction using a poly(oxyalkylene)diamine (a14) represented by Formula (5) as a reaction constituent

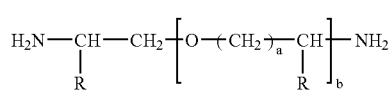
(5)

where Rs in the b-number of repeating units may be the same or different, each R represents a hydrogen atom or a $C_{1-6}$ alkyl group, a represents an integer from 1 to 8, and b represents an integer from 1 to 50.

Item 9. A method for forming a multilayer coating film according to Item 4, wherein the amino group-containing modified epoxy resin (A) is obtained by carrying out a reaction using an isocyanate (a15) represented by Formula (6) as a reaction constituent

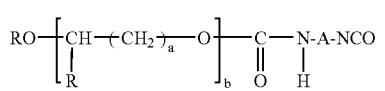
(6)

where Rs in the b-number of repeating units may be the same or different, each R represents a hydrogen atom or a $C_{1-6}$ alkyl group, A represents an alkylene group or a phenylene group, a represents an integer from 1 to 8, and b represents an integer from 1 to 50.

Item 10. A method for forming a multilayer coating film according to Item 1, wherein the cationic electrodeposition coating composition (I) contains 40 to 80 mass % of an amino group-containing modified epoxy resin (A) based on the total solid content of the resin component constituting the cationic electrodeposition coating composition, and the amino group-containing modified epoxy resin (A) contains 3 to 50 mass % of a polyglycerol chain (a16) represented by Formula (7) based on the resin solid content of the resin (A)

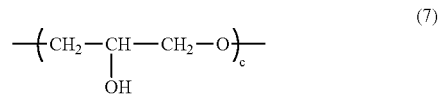
(7)

where c represents an integer from 1 to 50.

Item 11. A method for forming a multilayer coating film according to Item 1, wherein the cationic electrodeposition coating composition (I) contains 40 to 80 mass % of an amino group-containing modified epoxy resin (A) based on the total solid content of the resin component constituting the cationic electrodeposition coating composition, and the amino group-containing modified epoxy resin (A) contains 3 to 50 mass % of a poly(ethyleneimine) chain (a17) represented by Formula (8) based on the resin solid content of the resin (A)

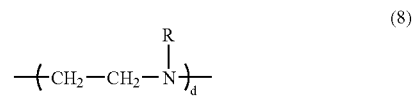
(8)

where R represents a hydrogen atom or a $C_{1-6}$ alkyl group and d represents an integer from 1 to 50.

Item 12. A method for forming a multilayer coating film according to claim 4, wherein the amino group-containing modified epoxy resin (A) is produced by reacting an epoxy resin (a2) having an epoxy equivalent of 170 to 500 and a bisphenol (a3) with at least one compound (a1) selected from the group consisting of poly(oxyalkylene)s (a11), (poly)oxyalkylene adducts (a12) of bisphenol A, poly(oxyalkylene)diglycidyl ethers (a13), poly(oxyalkylene)diamines (a14) and isocyanates (a15), at a ratio of 3 to 70 mass % of the compound (a1), 10 to 80 mass % of the epoxy resin (a2), and 10 to 70 mass % of the bisphenol (a3) based on the total solid content mass of the compound (a1), epoxy resin (a2) and bisphenol (a3), to obtain a modified epoxy resin (a4); and then reacting the modified epoxy resin (a4) with an amine compound (a5).

Item 13. A method for forming a multilayer coating film according to Item 1, wherein, in coating film forming equipment having in succession a coating film forming agent tank (1) and a coating film forming agent tank (2), a metal substrate is immersed in the first stage coating film forming agent tank (1) filled with a coating film forming agent (1) and electric current is applied to form a coating film (F1) on the metal substrate; and without water washing, the metal substrate with the coating film (F1) is immersed in the second stage coating film forming agent tank (2) filled with a coating film forming agent (2) to electrodeposit the coating film forming agent (2);

wherein the coating film forming agent (1) comprises 30 to 20,000 ppm, as a total metal quantity (on a mass basis), of at least one metal compound component (M) comprising a compound of at least one metal (m) selected from the group consisting of zirconium, titanium, cobalt, vanadium, tungsten, molybdenum, copper, zinc, indium, bismuth, yttrium, and lanthanide metals, and 0.1 to 40 mass % of a water-dispersible or water-soluble resin composition (B) selected from the group consisting of amino group-containing epoxy resins, polyvinylpyrrolidones, and polyvinyl alcohols; and wherein the coating film forming agent (2) comprises 50 to 90 mass % of a cationic resin composition and 10 to 50 mass % of a blocked polyisocyanate, based on the total solid content mass of the cationic resin composition and the blocked polyisocyanate.

Item 14. A method for forming a multilayer coating film according to Item 1, wherein the cationic electrodeposition coating composition (I) contains 40 to 80 mass % of an amino group-containing modified epoxy resin (A) and 20 to 60 mass % of a blocked polyisocyanate, based on the total solid content mass of the amino group-containing modified epoxy resin (A) and blocked polyisocyanate.

Item 15. A method for forming a multilayer coating film according to Item 13, wherein the metal compound component (M) in the coating film forming agent (1) contains a zirconium compound as an essential constituent.

Item 16. A method for forming a multilayer coating film according to Item 13, wherein pH of the coating film forming agent tank (1) is in a range of 4.5 to 8.0.

Item 17. A method for forming a multilayer coating film according to Item 1, wherein, in coating film forming equipment having in succession a coating film forming agent tank (1) and a coating film forming agent tank (2), a metal substrate is immersed in the first stage coating film forming agent tank (1) filled with a coating film forming agent (1) to form, with or without application of electric current, a coating film (F1) on the metal substrate; and without water washing, setting is performed and the metal substrate with the coating film (F1) is immersed in the second stage coating film forming agent tank (2) filled with a coating film forming agent (2) to conduct electrodeposition coating.

Item 18. A method for forming a multilayer coating film according to Item 17, wherein the metal substrate is immersed in the first stage coating film forming agent tank (1), electric current is applied at a voltage ($V_1$) of 1 to 50 V for 10 to 360 sec, and thereafter electrodeposition coating in the second stage coating film forming agent tank (2) is performed at a voltage ($V_2$) of 50 to 400 V for 60 to 600 sec.

Item 19. A method for forming a multilayer coating film according to Item 17, wherein the metal substrate is immersed in the first stage coating film forming agent tank (1) for 10 to 360 sec without application of electric current, and thereafter immersed in the second stage coating film forming agent tank (2) to perform electrodeposition coating at a voltage ($V_2$) of 50 to 400 V for 60 to 600 sec.

Item 20. A coated article obtained using a method for forming a multilayer coating film according to any of Items 1 to 19.

EFFECTS OF THE INVENTION

The method for forming a multilayer coating film of the present invention enables a coated article excellent in finish and corrosion resistance to be obtained even if water washing after chemical conversion treatment is omitted and chemical conversion coating solution is carried into the electrodeposition coating composition as a contaminant. By eliminating the water washing step as shown in FIG. 2, the method for forming a coating film according to the present invention can achieve process streamlining and space saving.

One of the reasons for these effects is the use of a cationic electrodeposition coating composition (I) containing a predetermined quantity of a specific amino group-containing modified epoxy resin (A) having excellent miscibility with the chemical conversion coating solution.

Other reasons for the effects of the present invention are such that the following effects 1 to 3 are exhibited in combination.

1. A coating film (F1) excellent in corrosion resistance can be formed at a relatively low metal compound component (M) content of 30 to 20,000 ppm as a total metal quantity (on a mass basis) in the coating film forming agent (1). As a result, the amount of the metal compound component (M) carried into the succeeding tank is also relatively small.

2. Owing to the fact that the coating film forming agent (1) is relatively high in pH and moderate in oxidative activity and the fact that the coating film forming agent (1) contains a resin composition (B), rust formation on the article being coated can be inhibited during the transfer from the first tank to the second tank.

3. The coating film forming agent (2) is excellent in miscibility with the metal compound (M).

Moreover, the prior art generally adopts a line process as shown in FIG. 1 (degreasing—surface conditioning and chemical conversion treatment—water washing—electrodeposition coating—UF washing—pure water washing—baking-drying), while the present invention enables the use of the line process shown in FIG. 2 (degreasing—coating film forming agent (1) in coating film forming agent tank (first tank)—coating film forming agent (2) in coating film forming agent tank (second tank)—UF washing—pure water washing—baking-drying), thereby making process streamlining and space saving (e.g., enabling omission of water washing equipment and waste water processing) possible.

DESCRIPTION OF THE NUMERALS

Figure 1:
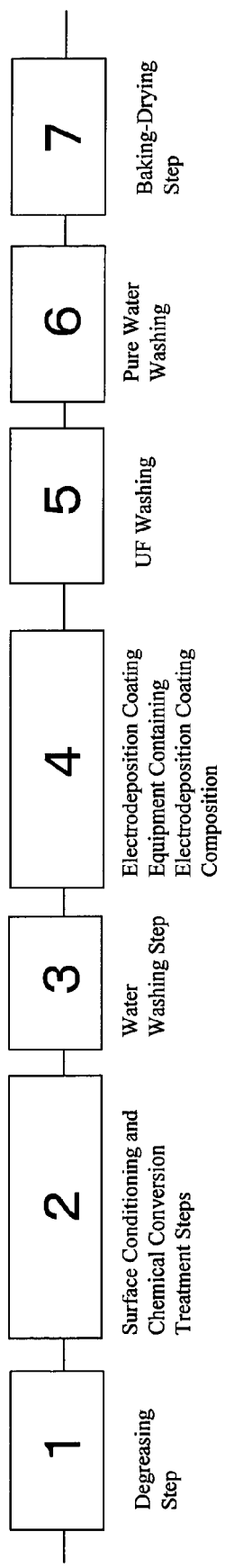
FIG. 1 is a schematic diagram showing an electrodeposition coating process according to the prior art.

1. Degreasing Step
2. Surface Conditioning and Chemical Conversion Treatment Steps
3. Water Washing Step
4. Electrodeposition Coating Equipment Containing Electrodeposition Coating Composition
5. UF Washing
6. Pure Water Washing
7. Baking-Drying Step
8. Step of Application of Film Forming Agent (1) in Film Forming Agent Tank (First Tank).
9. Step of Application of Film Forming Agent (2) in Film Forming Agent Tank (Second Tank).

Best Mode for Carrying Out the Invention

The present invention relates to a method for forming a multilayer coating film comprising: immersing a metal substrate in a coating film forming agent (1) as a chemical conversion coating solution to form a chemical conversion coating film; and, without water washing, forming a coating film by cationic electrodeposition using a coating film forming agent (2) as a specific cationic electrodeposition coating composition (I) onto the metal substrate with the chemical conversion coating film.

As used herein, "without water washing" means that at least one washing step selected from among industrial water washing, tap water washing and pure water washing can be omitted, in accordance with the required coating performance. For example, omitting industrial water washing and tap water washing and performing pure water washing corresponds to "without water washing".

A preferred embodiment of the present invention is a method for forming a multilayer coating film comprising:

in coating film forming equipment having in succession a coating film forming agent tank (1) and a coating film forming agent tank (2), immersing a metal substrate in the first stage coating film forming agent tank (1) filled with a specific coating film forming agent (1) to form, with or without application of electric current, a coating film (F1) on the metal substrate; and without water washing, immersing the metal substrate with the coating film (F1) in the second stage coating film forming agent tank (2) filled with a specific coating film forming agent (2) having the properties described below, to conduct electrodeposition coating.

Substrate to be Coated

Substrates usable in the multilayer coating film forming method of the present invention includes cold-rolled steel sheets, alloyed hot dip zinc-coated steel sheets, electro-galvanized steel sheets, electrolytic zinc-iron duplex plated steel sheets, organic composite plated steel sheets, Al materials, Mg materials and like metal substrates.

First Stage Coating Film Formation:

Coating Film Forming Agent (1):

The coating film forming agent (1) used in the above method comprises 30 to 20,000 ppm, as a total metal quantity (on a mass basis), of at least one metal compound component (M) comprising a compound of at least metal (a) selected from among zirconium, titanium, cobalt, vanadium, tungsten, molybdenum, copper, zinc, indium, bismuth, yttrium, iron, nickel, manganese, gallium, silver, lanthanide metals (lanthanum, cerium, praseodymium, neodymium, samarium, europium, gadolinium, terbium, dysprosium, holmium, erbium, thulium, ytterbium, lutetium); and 0.1 to 40 mass % of a water-dispersible or water-soluble resin composition (B).

Zirconium compounds usable in the metal compound component (M) include compounds that generate zirconium-containing ions such as zirconium ions, oxyzirconium ions, fluorozirconium ions and the like. Usable compounds that generate zirconium ions include, for example, oxyzirconium ion-generating compounds such as zirconyl nitrate, zirconyl acetate, zirconyl sulfate, etc.; and fluorozirconium ion-generating compounds such as zirconium hydrofluoric acid, sodium zirconium fluoride, potassium zirconium fluoride, lithium zirconium fluoride, ammonium zirconium fluoride, etc. Among these, zirconyl nitrate and ammonium zirconium fluoride are particularly suitable.

Titanium ion-generating compounds include, for example, titanium chloride and titanium sulfate; usable fluorotitanium ion-generating compounds include, for example, titanium hydrofluoric acid, sodium titanium fluoride, potassium titanium fluoride, lithium titanium fluoride, ammonium titanium fluoride, etc. Among these, ammonium titanium fluoride is particularly suitable.

Cobalt ion-generating compounds include cobalt chloride, cobalt bromide, cobalt iodide, cobalt nitrate, cobalt sulfate, cobalt acetate, ammonium cobalt sulfate, etc. Among these, cobalt nitrate is particularly suitable.

Vanadium ion-generating compounds include, for example, lithium orthovanadate, sodium orthovanadate, lithium metavanadate, potassium metavanadate, sodium metavanadate, ammonium metavanadate, sodium pyrovanadate, vanadyl chloride, vanadyl sulfate, etc. Among these, ammonium metavanadate is particularly suitable.

Tungsten ion-generating compounds include, for example, lithium tungstate, sodium tungstate, potassium tungstate, ammonium tungstate, sodium metatungstate, sodium paratungstate, ammonium pentatungstate, ammonium heptatungstate, sodium phosphotungstate, barium borotungstate, etc. Among these, ammonium tungstate and the like are particularly suitable.

Molybdenum ion-generating compounds include, for example, lithium molybdate, sodium molybdate, potassium molybdate, ammonium heptamolybdate, calcium molybdate, magnesium molybdate, strontium molybdate, barium molybdate, phosphomolybdic acid, sodium phosphomolybdate, zinc phosphomolybdate, etc.

Copper ion-generating compounds include, for example, copper sulfate, copper(II) nitrate trihydrate, copper(II) ammonium sulfate hexahydrate, cupric oxide, copper phosphate, etc.

Zinc ion-generating compounds include, for example, zinc acetate, zinc lactate, zinc oxide, etc.

Indium ion-generating compounds include, for example, ammonium indium nitrate.

Bismuth ion-generating compounds include, for example, inorganic bismuth-containing compounds such as bismuth chloride, bismuth oxychloride, bismuth bromide, bismuth silicate, bismuth hydroxide, bismuth trioxide, bismuth nitrate, bismuth nitrite, bismuth oxycarbonate, etc.; and bismuth lactate, triphenylbismuth, bismuth gallate, bismuth benzoate, bismuth citrate, bismuth methoxyacetate, bismuth acetate, bismuth formate, bismuth 2,2-dimethylolpropionate and the like.

Yttrium ion-generating compounds include yttrium nitrate, yttrium acetate, yttrium chloride, yttrium sulfamate, yttrium lactate, yttrium formate, etc.

Iron ion-generating compounds include, for example, iron (II) chloride, iron(III) chloride, ammonium iron(III) citrate, ammonium iron(III) oxalate, iron(III) nitrate, iron(III) fluoride, iron(III) sulfate, ammonium iron(III) sulfate, etc.

Nickel ion-generating compounds include, for example, nickel(II) chloride, nickel(II) acetate, nickel(II) citrate, nickel (II) oxalate, nickel(II) nitrate, nickel(II) sulfamate, nickel(II) carbonate, nickel(II) sulfate, nickel(II) fluoride, etc.

Manganese ion-generating compounds include, for example, manganese(II) acetate, manganese(III) acetate, manganese(II) oxalate, manganese(II) nitrate, manganese(II) carbonate, manganese(II) sulfate, ammonium manganese(II) sulfate, etc.

Gallium ion-generating compounds include, for example, gallium nitrate.

Silver ion-generating compounds include, for example, silver(I) acetate, silver(I) chloride, silver (I) nitrate, silver (I) sulfate, etc.

Of lanthanide metal compounds, those that generate lanthanum ions include, for example, lanthanum nitrate, lanthanum fluoride, lanthanum acetate, lanthanum boride, lanthanum phosphate, lanthanum carbonate, etc.; those that generate cerium ions include, for example, cerium(III) nitrate, cerium(III) chloride, cerium(III) acetate, cerium(III) oxalate, ammonium cerium(III) nitrate, diammonium cerium (IV) nitrate, etc.; those that generate praseodymium ions include, for example, praseodymium nitrate, praseodymium sulfate, praseodymium oxalate, etc.; and those that generate neodymium ions include, for example, neodymium nitrate, neodymium oxide, etc.

The metal compound component (M) in the coating film forming agent (1) may, as required, further contain a compound of at least one metal selected from the group consisting of aluminum, alkali metals (lithium, sodium, potassium, rubidium, cesium, francium) and alkaline earth metals (beryllium, magnesium, calcium, strontium, barium, radium). Among these, zirconium compounds and aluminum nitrate are preferable.

Water-Dispersible or Water-Soluble Resin Composition (B):

The coating film forming agent (1) contains 0.1 to 40 mass % of water-dispersible or water-soluble resin composition (B). Examples of the water-dispersible or water-soluble resin composition (B) include a cationic resin composition whose molecule contains a group that can be cationized in an aqueous medium, such as an amino group, an ammonium salt group, a sulfonium salt group or a phosphonium salt group.

Also usable is an anionic resin composition whose molecule contains a group that can be anionized in an aqueous medium, such as a carboxyl group, a sulfonic acid group or a phosphoric acid group. Usable types of resin include, for example, epoxy resins, acrylic resins, polybutadiene resins, alkyd resins, polyester resins, etc.

Among these functional groups, a cationic resin composition whose molecule contains an amino group is preferable because it causes no adverse effect even if mixed into the coating film forming agent (2) as a contaminant and, in addition, inhibits rusting of the metal material coated with the coating film forming agent (1) during transfer to the coating film forming agent tank (2), and also improves the corrosion resistance of the coated article obtained. From these aspects, the resin preferably has an amine number in the range of 30 to 150 mg/KOH/g resin solid content, more preferably 60 to 130 mg/KOH/g resin solid content.

It is also possible to use a resin or compound that contains in the molecule a hydroxyl group, an oxyethylene chain or the like as a nonionic and high polar group, and that is water-dispersible or water-soluble in an aqueous medium. Specific examples of such resins and compounds include polyvinyl alcohol, polyoxyethylene, polyvinylpyrrolidone, polyoxypropylene, hydroxyethylcellulose, hydroxypropyl methylcellulose, etc.

The water-dispersible or water-soluble resin composition (B) discussed in the foregoing can be used to prepare the coating film forming agent (1) by, as required, adding a neutralizing agent and conducting water-dispersion with deionized water to obtain a resin emulsion.

Coating Film Forming Agent (1):

The coating film forming agent (1) can be prepared by, for example, the methods (1) to (4) set out below.

(1) Method in which the metal compound component (M) is added to the water-dispersible or water-soluble resin composition (B), and a neutralizing agent is added thereto as required to disperse or dissolve the resin composition (B) in water, followed by adjustment with deionized water;

(2) Method in which the water-dispersed or water-dissolved resin composition (B) is added to the metal compound component (A), followed by adjustment with deionized water;

(3) Method in which the metal compound component (M) and the resin composition (B) dispersed or dissolved in water are added to a bath of a coating film forming agent prepared beforehand, followed by adjustment with deionized water; and (4) Chemical conversion treatment, such as zinc phosphate chemical conversion treatment, a treatment with a metal surface treatment agent comprising at least one metal selected from the group consisting of zirconium, titanium molybdenum, tungsten, manganese and cerium, or the like.

The coating film forming agent (1) may contain the metal compound component (M) in an amount of, as a total metal quantity (on a mass basis), 30 to 20,000 ppm, preferably 50 to 10,000 ppm, and more preferably 100 to 5,000 ppm; and may further contain the water-dispersible or water-soluble resin composition (B) in an amount of, relative to the mass of the coating film forming agent (1), 1 to 40 mass %, preferably 0.5 to 20 mass %. The pH of the coating film forming agent (1) is in the range of 4.5 to 8.0, preferably 5.0 to 7.5.

The pH within the above range inhibits rusting during transfer of the metal substrate with the coating (F1) to the coating film forming agent tank (2), thereby contributing to the improvement of corrosion resistance and finish.

When the metal compound component (M) in the coating film forming agent (1) includes a zirconium compound and a compound of a metal (m), the content of the compound of the metal (m) can be varied with the intended use and the like of the coated article formed by the method of the present invention. However, as expressed relative to the mass of the metal compound component (M), the content of the compound of the metal (m) can generally be defined to fall within the range of 90 mass % or less, preferably 5 to 80 mass %, more preferably 10 to 75 mass %.

Coating Film Forming Method:

Methods of forming the coating film in accordance with the present invention include a method (1) comprising immersing a metal substrate in the coating film forming agent tank (1) filled with the coating film forming agent (1) for 10 to 360 sec, preferably 50 to 3.00 sec, more preferably 70 to 240 sec to form the coating film (F1) on the metal substrate; a method (2) comprising applying electric current at 1 to 50 V for 10 to 360 sec, preferably 2 to 30 V for 30 to 180 sec, using the coating film forming agent (1) as the bath and the metal substrate as the cathode; and a method (3) comprising immersion for a given time and thereafter application of electric current; i.e., immersion for 10 to 180 sec, preferably 5 to 120 sec, and application of electric current at 1 to 100 V for 10 to 360 sec or at 2 to 60 V for 30 to 180 sec.

The deposition mechanism of the coating film (F1) is such that the immersion or electric current application causes a hydrolysis reaction due to the increase of the pH in the vicinity of the metal substrate, and the metal ionic species in the coating film forming agent deposit on the metal substrate as a sparingly soluble coating film (F1) (chiefly, metal oxide and part of resin component (B)), thereby forming a coating film (F1) containing the metal compound component (M) and the resin composition (B).

When a zirconium compound and a compound of a metal (m) are used in combination, it is possible to use a single compound in which zirconium and the metal (m) other than zirconium are co-present, instead of the combined use. When two or more compounds containing metals (m) are used in combination, it is possible to use a single compound in which two or more metals (m) and the resin composition (B) are co-present, instead of the combined use.

The metal substrate with the coating film (F1) thus formed can be subjected, without water washing, to the second stage coating film formation on the coating film (F1). The metal substrate with the coating film (F1) can be subjected, without water washing, to setting in an appropriate manner, and then immersed in the second stage coating film forming agent tank (2) filled with the coating film forming agent (2) for electrodeposition coating, to thereby perform the second stage coating film formation on the coating film (F1).

The conditions for the setting are 0 to 80° C., preferably 5 to 50° C., more preferably 10 to 40° C., for 10 sec to 30 min, preferably 20 sec to 20 min, more preferably 30 sec to 15 min, so that excess coating film forming agent (1) adhered to the substrate being coated can be removed to form a coating film excellent in finish. It is also possible to perform, during setting, air-blowing, shaking and the like of the substrate being coated.

Second Stage Coating Film Formation:

The obtained metal substrate with the coating film (F1) is then immersed in the second stage coating film forming agent tank (2) filled with the coating film forming agent (2) as a cationic electrodeposition coating composition, and electric current is applied to form a coating film (F2) on the coating film (F1).

Cationic Electrodeposition Coating Composition (I)

The cationic electrodeposition coating composition (I) is a coating film forming agent comprising, based on the total solid content of the resin component constituting the cationic electrodeposition coating composition, an amino group-containing modified epoxy resin (A) in an amount of usually 40 to 90 mass %, preferably 55 to 85 mass %, more preferably 60 to 80 mass %; and a blocked polyisocyanate in an amount of usually 10 to 60 mass %, preferably 15 to 45 mass %, more preferably 20 to 40 mass %; the amino group-containing modified epoxy resin (A) containing 3 to 50 mass % of a poly(oxyalkylene) chain represented by Formula (1) relative to the resin solid content of the resin (A).

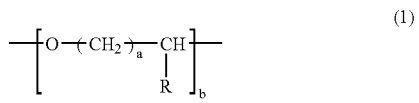

In Formula (1), Rs in the b-number of repeating units may be the same or different, each R represents a hydrogen atom or a $C_{1-6}$ alkyl group, a represents an integer from 1 to 8, and b represents an integer from 1 to 50.

The amino group-containing modified epoxy resin (A) can be produced by reacting an epoxy resin (a2) and a bisphenol (a3) using at least one compound (a1) selected from the group consisting of poly(oxyalkylene)s (a11), (poly)oxyalkylene adducts (a12) of bisphenol A, poly(oxyalkylene)diglycidyl ethers (a13), poly(oxyalkylene)diamines (a14) and isocyanates (a15) to obtain a modified epoxy resin (a4), which is then reacted with an amine compound (a5).

Amino Group-Containing Modified Epoxy Resin (A) Obtained Using Poly(oxyalkylene) (a11)

The amino group-containing modified epoxy resin (A) can be obtained by using a poly(oxyalkylene) (a11) represented by Formula (2) as a constituent in the reaction.

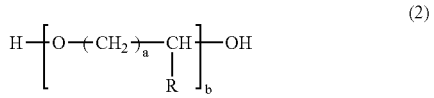

In Formula (2), Rs in the b-number of repeating units may be the same or different, each R represents a hydrogen atom or a $C_{1-6}$ alkyl group, a represents an integer from 1 to 8, and b represents an integer from 1 to 50.

Among the compounds represented by Formula (2), polyethylene glycol (a compound of Formula (2) where R is a hydrogen atom and a=1) is preferable from the aspects of coating composition stability and the finish and corrosion resistance of the coating film. The molecular weight thereof is 70 to 4,000, preferably 200 to 3,000.

Amino Group-Containing Modified Epoxy Resin (A) Obtained Using (Poly)oxyalkylene Adduct (a12) of Bisphenol A The amino group-containing modified epoxy resin (A) can be obtained by using a (poly)oxyalkylene adduct (a12) of bisphenol A, represented by Formula (3), as a constituent in the reaction.

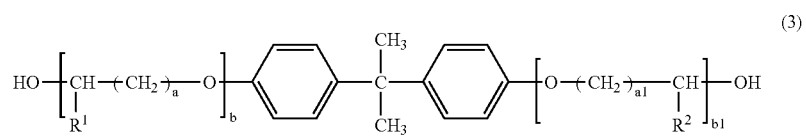

In Formula (3), $R^1$s and $R^2$s in the b-number and b1-number of repeating units may be the same or different, $R^1$ and $R^2$ each represent a hydrogen atom or a $C_{1-6}$ alkyl group, a and a1 each represent an integer from 1 to 8 which may be the same or different, and b and b1 each represent an integer from 1 to 50 which may be the same or different.

Among these, ethylene glycol adducts of bisphenol A (compounds of Formula (3) in which R is a hydrogen atom and a=1) are preferable from the aspects of coating composition stability and the finish and corrosion resistance of the coating film. The number average molecular weight thereof is 300 to 2,000, preferably 400 to 1,500.

Examples of commercially available products include Newpol BPE-60 and Newpol BPE-180 (Sanyo Chemical Industries, Ltd.).

Amino Group-Containing Modified Epoxy Resin (A) Obtained Using Poly(oxyalkylene)diglycidyl ether (a13)

The amino group-containing modified epoxy resin (A) can be obtained by using a poly(oxyalkylene)diglycidyl ether represented by Formula (4) below as a constituent in the reaction.

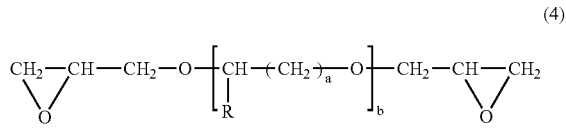

In Formula (4), Rs in the b-number of repeating units may be the same or different, each R represents a hydrogen atom or a $C_{1-6}$ alkyl group, a represents an integer from 1 to 8, and b represents an integer from 1 to 50.

Polyethylene glycol diglycidyl ether (a compound of Formula (4) in which R is a hydrogen atom and a=1) and polypropylene glycol diglycidyl ether (a compound of Formula (4) in which R is a methyl group and a=1) are preferable from the aspects of coating composition stability and the finish and corrosion resistance of the coating film. The molecular weight thereof is 230 to 2,000, preferably 340 to 1,200.

The aforesaid polyethylene glycol diglycidyl ethers are commercially available, for example, under the trade names Denacol EX-810, EX-821, EX-832, EX-841, EX-851 and EX-861 (Nagase ChemteX Corporation). The aforesaid polypropylene glycol diglycidyl ethers are commercially available, for example, under the trade names Denacol EX-911, EX-920, EX-931 and EX-941 (Nagase ChemteX Corporation).

Amino Group-Containing Modified Epoxy Resin (A) Obtained Using Poly(oxyalkylene)Diamine (a14)

The amino group-containing modified epoxy resin (A) can be obtained by using a poly(oxyalkylene)diamine (a14) represented by Formula (5) as a constituent in the reaction.

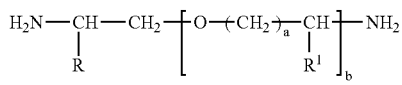

In Formula (5), Rs and $R^1$s in the b-number of repeating units may be the same or different, $R^2$ and $R^3$ each represent a hydrogen atom or $C_{1-6}$ alkyl group, a represents an integer from 1 to 8, and b represents an integer from 1 to 50.)

From the aspects of coating composition stability and the finish and corrosion resistance of the coating film, it is desirable for the molecular weight of the poly(oxyalkylene)diamine represented by Formula (5) to be 600 to 2,000, preferably 800 to 1,000.

Usable commercial products of the aforesaid poly(oxyalkylene)diamine include, for example, JEFFAMINE D400 and JEFFAMINE D2000 (Huntsman Corporation).

Amino Group-Containing Modified Epoxy Resin (A) Obtained Using Isocyanate (a15)

The amino group-containing modified epoxy resin (A) can be obtained by a reaction using an isocyanate represented by Formula (6) as a constituent.

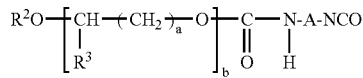

In Formula (6), $R^2$s and $R^3$s in the b-number of repeating units may be the same or different, $R^2$ and $R^3$ each represent a hydrogen atom or $C_{1-6}$ alkyl group, A represents an alkylene group or a phenylene group, a represents an integer from 1 to 8, and b represents an integer from 1 and 50.

From the aspects of coating composition stability and the finish and corrosion resistance of the coating film, it is desirable for the aforesaid $R^2$ to be a methyl group, $R^3$ to be a hydrogen atom, A to be a hexamethylene group, and the molecular weight to be 600 to 2,000, preferably 800 to 1,000.

Amino Group-Containing Modified Epoxy Resin (A) Containing Polyglycerol Chain (a16)

Besides the amino group-containing modified epoxy resins (A) described above, an amino group-containing modified epoxy resin (A1) containing 3 to 50 mass % of a polyglycerol chain (a16) represented by Formula (7) is also usable in the multilayer coating film forming method of the present invention, and can achieve effects comparable to those of the amino group-containing modified epoxy resins (A).

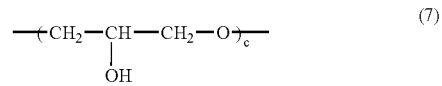

In Formula (7), c represents an integer from 1 to 50.

A polyglycerol chain with a molecular weight of about 800 can be introduced into the amino group-containing modified epoxy resin (A1) by, for example, reacting a polyglycerol with an epoxy resin (a2), a bisphenol (a3) in the presence of a catalyst in a suitable solvent to obtain a modified epoxy resin having a partial structure represented by Formula (7), and then reacting the modified epoxy resin with an amine compound.

The amino group-containing modified epoxy resin (A1) thus obtained has a number average molecular weight of preferably 600 to 3,000, more preferably 1,000 to 2,500, and an amine number of preferably 30 to 100 mgKOH/g resin solid content, and more preferably 40 to 80 mgKOH/g resin solid content.

Amino Group-Containing Modified Epoxy Resin (A) Containing Polyethyleneimine Chain (a17)

Further, an amino group-containing modified epoxy resin (A2) containing, in addition to the polyoxyalkylene chain contained in the amino group-containing modified epoxy resin (A), 3 to 50 mass of a polyethyleneimine chain (a17) represented by Formula (8), can also be used in the multilayer coating film forming method of the present invention, and can achieve effects comparable to those obtained by the resin (A).

In Formula (8), R represents a hydrogen atom or a $C_{1-6}$ alkyl group, and d represents an integer from 1 to 50.

The amino group-containing modified epoxy resin (A2) can be produced by, for example, reacting a polyethyleneimine with a molecular weight of about 600, an epoxy resin (a2), and a bisphenol (a3) in the presence of a catalyst in a suitable solvent to obtain a modified epoxy resin having a partial structure represented by Formula (8), and reacting the modified epoxy resin with an amine compound.

The amino group-containing modified epoxy resin (A2) thus obtained has a number average molecular weight of preferably 600 to 3,000, more preferably 1,000 to 2,500, and an amine number of preferably 80 to 200 mgKOH/g resin solid content, more preferably 70 to 150 mgKOH/g resin solid content.

Production of Amino Group-Containing Modified Epoxy Resin (A)

The amino group-containing modified epoxy resin (A) can be produced by reacting an epoxy resin (a2) having an epoxy equivalent of 170 to 500 and a bisphenol (a3) with at least one compound (a1) selected from among poly(oxyalkylene)s (a11), (poly)oxyalkylene adducts (a12) of bisphenol A, poly (oxyalkylene)diglycidyl ethers (a13), poly(oxyalkylene)diamines (a14) and isocyanates (a15), and a polyglycerol chain (a16) or a polyethyleneimine chain (a17) to obtain a modified epoxy resin (a4) and thereafter reacting the modified epoxy resin with an amine compound (a5). The production process of the amino group-containing modified epoxy resin (A) is explained in the following. The amino group-containing modified epoxy resins (A1) and (A2) can be produced by following the production process for the amino group-containing modified epoxy resin (A).

Compound (a1)

The poly(oxyalkylene) (a11) represented by Formula (2) can be used as the compound (a1).

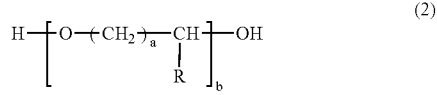

In Formula (2), Rs in the b-number of repeating units may be the same or different, each R represents a hydrogen atom or a $C_{1-6}$ alkyl group, a represents an integer from 1 to 8, and b represents an integer from 1 to 50.

Among the poly(oxyalkylene)s (a11) represented by Formula (2), polyethylene glycol (R is a hydrogen atom and a=1) is particularly preferable for achieving the effects of the present invention.

For the compound (a1), instead of or together with a poly (oxyalkylene) (a11), at least one compound selected from among (poly)oxyalkylene adducts (a12) of bisphenol A, poly (oxyalkylene)diglycidyl ethers (a13), poly(oxyalkylene)diamines (a14) and isocyanates (a15) can be suitably used.

Epoxy Compound (a2)

The epoxy compound (a2) is a compound having 2 or more epoxy groups per molecule. Those having a "number average molecular weight" of 340 to 1,500, preferably 340 to 1,000, and an "epoxy equivalent" of 170 to 500, more preferably 170 to 400 are suitable. A epoxy compound (a2) obtained by reaction of a polyphenol compound and epihalohydrin is particularly preferable.

As used herein, the "number average molecular weight" is determined in accordance with the method of JIS K 0124-83, from a chromatogram obtained with an RI refractometer at 40° C. and a flow rate of 1.0 ml/min, using 4 separation columns "TSK GEL 4000HXL", "TSK GEL 3000HXL", "TSK GEL 2500HXL" and "TSK GEL 2000HXL" (products of Tosoh Corporation) and tetrahydrofuran for GPC as the eluent, and the calibration curve of standard polystyrene.

Polyphenol compounds usable for forming the epoxy resin include, for example, bis(4-hydroxyphenyl)-2,2-propane (bisphenol A), bis(4-hydroxyphenyl)methane (bisphenol F), 4,4'-dihydroxybenzophenone, bis(4-hydroxyphenyl)-1,1-ethane, bis(4-hydroxyphenyl)-1,1-isobutane, bis(4-hydroxy-2 or 3 tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolak and cresol novolak. Also usable are hydrogenated phenols such as bis (4-hydroxycyclohexyl)methane (hydrogenated bisphenol F), 2,2-bis(4-hydroxycyclohexyl)propane (hydrogenated bisphenol A) and the like.

Moreover, among epoxy resins obtained by reacting a polyphenol compound and epichlorohydrin, one derived from bisphenol A and indicated by Formula (9) is particularly suitable.

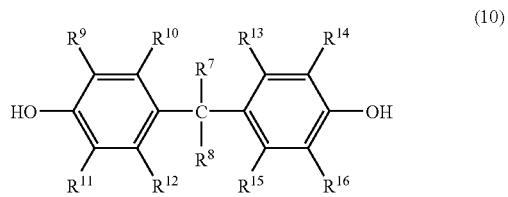

In Formula (10), $R^7$ and $R^8$ each represent a hydrogen atom or a $C_{1-6}$ alkyl group, and $R^9$, $R^{10}$, $R^{11}$, $R^{12}$, $R^{13}$, $R^{14}$, $R^{15}$ and $R^{16}$ each represent a hydrogen atom or a $C_{1-6}$ alkyl group. Specific examples include bis(4-hydroxyphenyl)-2,2-propane (bisphenol A) and bis(4-hydroxyphenyl)methane (bisphenol F).

The modified epoxy resin (a4) is usually obtained by mixing a compound (a1), an epoxy resin (a2) and a bisphenol (a3), and performing a reaction at about 80 to about 200° C., preferably about 90 to about 180° C., for about 1 to 6 hours, preferably 1 to 5 hours, in the presence of an appropriate reaction catalyst such as dimethylbenzylamine, tributylamine or like tertiary amine, tetraethylammonium bromide, tetrabutylammonium bromide or like quaternary ammonium salt, or the like.

It is also possible to use a small amount of secondary amine as a reaction catalyst in the above reaction. Usable secondary amines include, for example, diethylamine, dibutylamine, diethanolamine, dipropanolamine, methylethanolamine, etc. These secondary amines react with the epoxy group of the epoxy resin (a2) to form tertiary amines, which act as reaction catalysts.

In the modified epoxy resin (a4), the compound (a1) accounts for 3 to 70 mass %, preferably 5 to 30 mass %; the epoxy resin (a2) accounts for 10 to 80 mass %, preferably 15 to 75 mass %; and the bisphenol (a3) accounts for 10 to 70 mass %, preferably 20 to 50 mass %, based on the total solid content mass of the compound (a1), epoxy resin (a2) and bisphenol (a3).

A solvent can be suitably used in the production. Usable solvents include, for example, hydrocarbons such as toluene, xylene, cyclohexane, n-hexane and the like; esters such as methyl acetate, ethyl acetate, butyl acetate and the like; ketones such as acetone, methyl ethyl ketone, methyl isobutyl ketone, methyl amyl ketone and the like; amides such as dimethylformamide, dimethylacetamide and the like; and

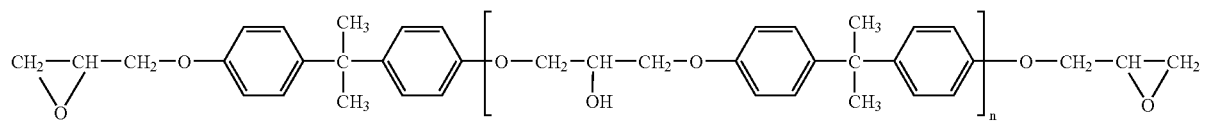

In Formula (9), n is from 0 to 2.

The epoxy resin is commercially available, for example, from Japan Epoxy Resins Co., Ltd. under the trade names jER828EL and jER1001.

Bisphenol (a3)

The bisphenol (a3) includes the compound represented by Formula (10) below.

mixtures thereof. The thus obtained amino group-containing modified epoxy resin (A) has an epoxy equivalent of 500 to 3,000, preferably 600 to 2,500.

The amine compound (a5) to be reacted with the modified epoxy resin (a4) is used to introduce an amino group into the modified epoxy resin and thereby cationize the modified epoxy resin (a).

Amine compounds (a5) usable for this purpose include, for example, mono- or di-alkylamines such as monomethylamine, dimethylamine, monoethylamine, diethylamine, monoisopropylamine, diisopropylamine, monobutylamine, dibutylamine, etc.; alkanolamines such as monoethanolamine, diethanolamine, mono(2-hydroxypropyl)amine, di(2-hydroxypropyl)amine, monomethylaminoethanol, monoethylaminoethanol, etc.; alkylenepolyamines such as ethylenediamine, propylenediamine, butylenediamine, hexamethylenediamine, tetraethylenepentamine, pentaethylenehexamine, diethylaminopropylamine, diethyelenetriamine, triethylenetetramine, etc., and ketimines of these polyamines; alkyleneimines such as ethyleneimine, propyleneimine, etc.; cyclic amines such as piperazine, morpholine, pyrazine, etc.; and the like. Among the foregoing amine compounds, amine compounds in which the primary amine groups are converted to ketimines can be used concurrently.

The amino group-containing modified epoxy resin (A) can be produced by addition reaction of the amine compound (a5) with the modified epoxy resin (a4). The proportion of the constituents in the addition reaction is not strictly limited and can be suitably varied in accordance with the intended use and the like of the cationic electrodeposition coating composition (I). However, based on the total solid content mass of the modified epoxy resin (a4) and amine compound (a5), the modified epoxy resin (a4) accounts for 50 to 90 mass %, preferably 50 to 85 mass %, and the amine compound (a5) accounts for 5 to 25 mass %, preferably 6 to 20 mass %.

The addition reaction is usually conducted in a suitable solvent at about 80 to about 170° C., preferably about 90 to about 150° C. for 0.5 to 6 hours, preferably 1 to 5 hours.

Solvents usable in the reaction include, for example, hydrocarbons such as toluene, xylene, cyclohexane, n-hexane and the like; esters such as methyl acetate, ethyl acetate, butyl acetate and the like; ketones such as acetone, methyl ethyl ketone, methyl isobutyl ketone, methyl amyl ketone and the like; amides such as dimethylformamide, dimethylacetamide and the like; alcohols such as methanol, ethanol, n-propanol, iso-propanol and the like; aromatic alkyl alcohols such as phenyl carbinol, methyl phenyl carbinol and the like; ether alcohol compounds such as ethylene glycol monobutyl ether, diethylene glycol monoethyl ether and the like; mixtures thereof; etc.

The thus obtained amino group-containing modified epoxy resin (A) contains 3 to 50 mass %, preferably 5 to 40 mass %, more preferably 8 to 35 mass %, of a poly(oxyalkylene) chain (i), relative to the resin solid content of the resin (A).

When the amount of the poly(oxyalkylene) chain (i) in the amino group-containing modified epoxy resin (A) exceeds 50 mass %, water solubility of the resin (A) increases markedly. This is undesirable because it makes production of an emulsion using the resin (A) difficult and may degrade the stability of a coating composition obtained using the resin (A).

The resin (A) has a number average molecular weight of preferably 600 to 3,000, more preferably 1,000 to 2,500, and has an amine number of preferably 30 to 100 mg/KOH/g resin solid content, more preferably 40 to 80 mg/KOH/g resin solid content.

Values within the foregoing ranges are preferable for obtaining a coated article excellent in finish and corrosion resistance even if chemical conversion coating solution is carried as a contaminant into the electrodeposition coating composition.

It is also possible to use a known cationic resin composition. Usable cationic resin compositions include, for example, a resin whose molecule contains a group that can be cationized in an aqueous medium, such as an amino group, an ammonium salt group, a sulfonium salt group, a phosphonium salt group or the like. The type of resin of the cationic resin composition may be, for example, an epoxy resin, an acrylic resin, a polybutadiene resin, an alkyd resin, a polyester resin, or the like.

The coating film forming agent (2) can be used as diluted with deionized water or the like to adjust the bath solid concentration to usually 5 to 40 mass %, preferably 8 to 15 mass %, and the pH to usually 1.0 to 9.0, preferably 3 to 6.

Coating of a metal substrate in accordance with the present invention can be conducted by immersing the metal substrate in a coating film forming agent tank (2) filled with the coating film forming agent (2) and applying electric current at a voltage of 50 to 400 V, preferably 100 to 370 V, more preferably 150 to 350 V, for 60 to 600 sec, preferably 120 to 480 sec, more preferably 150 to 360 sec, thereby forming a coating film (F2) on the coating film (F1).

The electrodeposition in the coating film forming agent tank (2) can usually be performed at an inter-electrode distance of 0.1 to 5 m, preferably 0.2 to 3 m, more preferably 0.3 to 1 m and an anode/cathode ratio of 1/8 to 2/1, preferably 1/5 to 1/2.

The suitable bath temperature of the coating film forming agent is usually 5 to 45° C., preferably 10 to 40° C., more preferably 20 to 35° C. The deposited film can be cured by baking. The suitable baking temperature of the film is usually 100 to 200° C., preferably 120 to 180° C., on the surface of the coated article; and the baking time may be 5 to 90 min, preferably 10 to 50 min.

Crosslinking Agent

In the coating film forming method of the present invention, the cationic electrodeposition coating composition (I) may contain, based on the total solid content of the resin component constituting the coating composition, 10 to 60 mass % of a blocked polyisocyanate compound as a crosslinking agent for enhancing curability and coating performance, in addition to 40 to 90 mass % of the amino group-containing modified epoxy resin (A).

Usable blocked polyisocyanate compounds include aromatic, alicyclic or aliphatic polyisocyanate compounds and the like blocked with a blocking agent. These compounds can be used individually or in combination of two or more.

Specific examples of aromatic polyisocyanates include 1,3- or 1,4-phenylene diisocyanate, 2,4- or 2,6-tolylene diisocyanate (TDI), crude TDI, 2,4'- or 4,4'-diphenylmethane diisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI [polymethylenepolyphenylisocyanate], 1,5-naphthylenediisocyanate, 4,4',4"-triphenylmethane triisocyanate, m- or p-isocyanatophenylsulfonyl isocyanate, etc.

Usable aliphatic polyisocyanates include, for example, ethylene diisocyanate, tetramethylene diisocyanate, hexamethylene diisocyanate (HDI), p-xylene diisocyanate (XDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl)fumarate, bis(2-isocyanatoethyl)carbonate, 2-isocyanatoethyl-2,6-diisocyanato hexanoate, etc.

Usable alicyclic polyisocyanates include, for example, isophorone diisocyanate (IPDI), dicyclohexylmethane-4,4'-diisocyanate (hydrogenated MDI), a,a,a',a'-tetramethylxylylenene diisocyanate (TMXDI), cyclohexylene diisocyanate, etc.

The blocking agent is added to the isocyanate groups in the polyisocyanate compounds to block the compounds. Blocking agents satisfying such requirement include, for example, lactam compounds such as ε-caprolactam, γ-butyrolactam, etc.; oxime compounds such as methyl ethyl ketoxime, cyclohexanoxime, etc.; phenolic compounds such as phenol, para-t-butylphenol, cresol, etc.; aliphatic alcohols such as n-butanol, 2-ethylhexanol, etc.; aromatic alkylalcohols such as phenylcarbinol, methylphenylcarbinol, etc.; ether alcohol compounds such as ethylene glycol monobutyl ether, diethylene glycol monoethyl ether, etc.; and hydroxyl-containing compounds such as propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol, 1,4-hexanediol, 2,2-diimethylolpropionic acid, 2,2-dimethylolbutanoic acid, dimethylolvaleric acid, glyceric acid, etc.

The amino group-containing modified epoxy resin (A) and blocked polyisocyanate can be dispersed in water using a neutralizing agent such as a carboxylic acid, and deionized water to thereby form a resin emulsion, which can be used for preparation of the cationic electrodeposition coating composition (I).

The cationic electrodeposition coating composition (I) may further contain, if necessary, other additives such as pigments, catalysts, organic solvents, pigment dispersants, surface conditioning agents, surfactants and the like, in amounts conventionally used in the field. Usable pigments and catalysts include, for example, coloring pigments such as titanium white, carbon black, etc.; extenders such as clay, talc, baryta, etc.; anticorrosion pigments such as aluminum dihydrogen tripolyphosphate, aluminum phosphomolybdate, etc.; organotin compounds such as dibutyltin oxide, dioctyltin oxide, etc.; and tin compounds such as aliphatic or aromatic carboxylates of dialkyltin, for example, dibutyltin dilaurate, dioctyltin dilaurate, dibutyltin diacetate, dioctyltin dibenzoate, dibutyltin dibenzoate, etc.

Coating Method

The cationic electrodeposition coating composition (I) can be used as diluted with deionized water or the like to adjust the bath solid concentration to usually 5 to 40 mass %, preferably 8 to 15 mass %, and the pH to usually 1.0 to 9.0, preferably 3.0 to 6.0.

Figure 2:
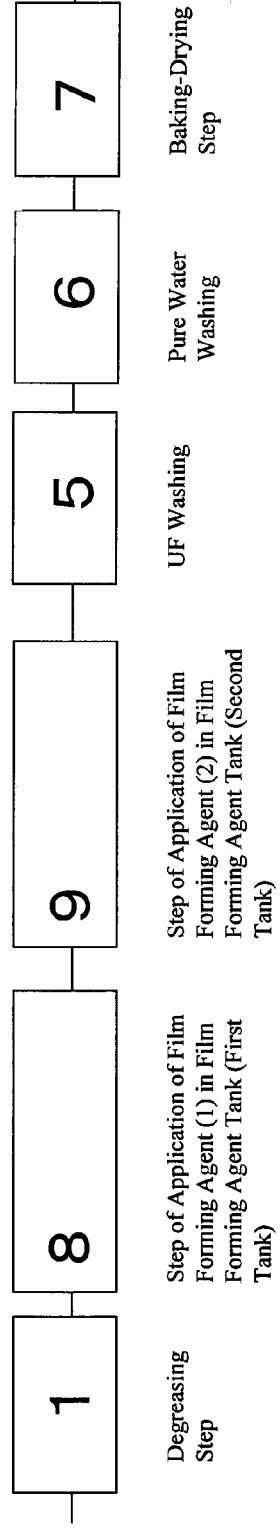
FIG. 2 is a schematic diagram showing the coating film forming process according to the present invention.
Figure 3:
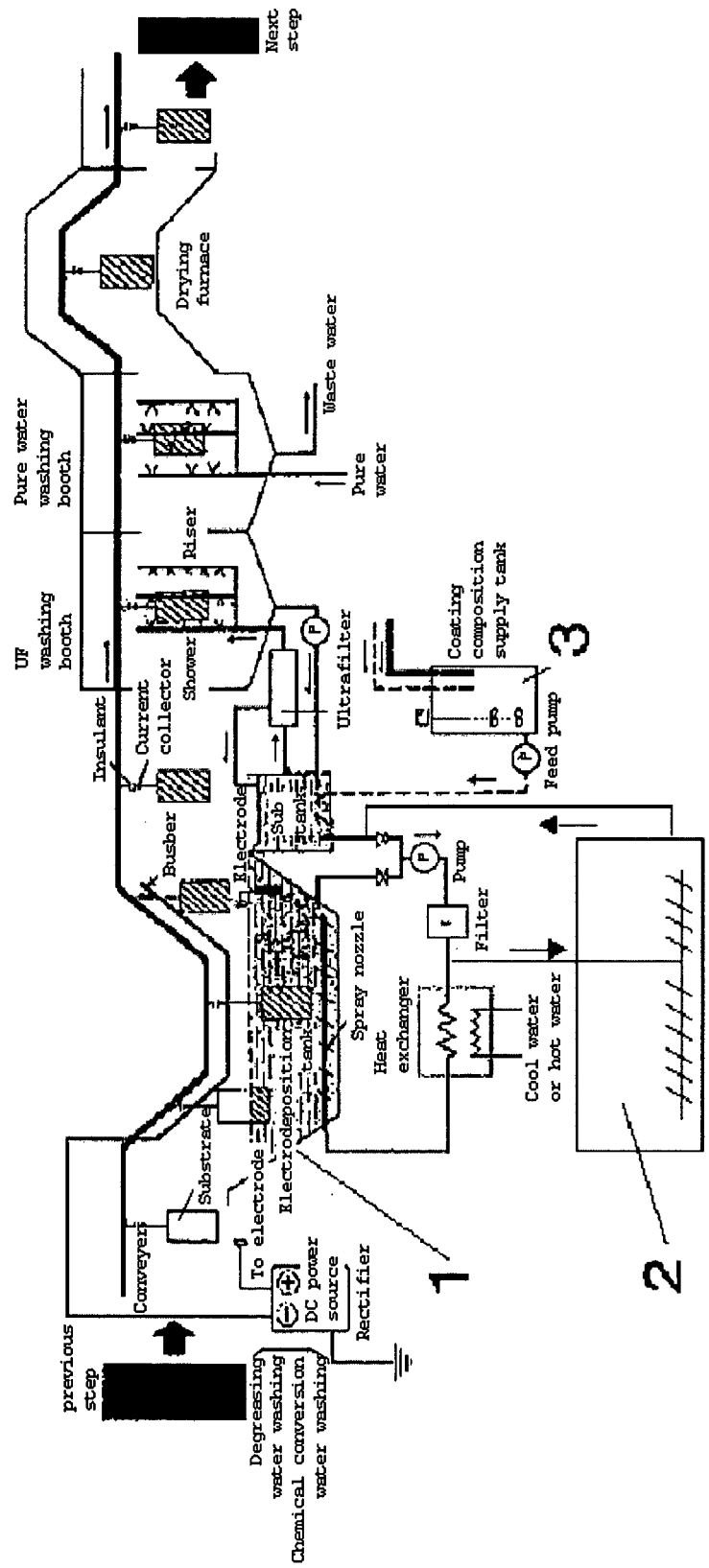
FIG. 3 is a conceptual drawing of a coating line using a coating film forming method according to the present invention.

The present invention is a method for forming a multilayer coating film, comprising immersing a metal substrate in a chemical conversion coating solution to form a chemical conversion coating film; and, without water washing, forming a coating film by electrodepositing the cationic electrodeposition coating composition (I). Specifically, as shown in FIG. 2, in the method of the present invention, electrodeposition coating is carried out without water washing after the steps of "hot-water washing (1), (2)→degreasing (3)→water washing (industrial water washing (4), pure water washing (5))→surface conditioning (6)→chemical conversion treatment (7)".

According to the method of the present invention, even if chemical conversion coating solution is carried into the electrodeposition coating composition as a contaminant, the electrodeposition coating composition is unaffected by a chemical conversion coating solution and a coated article with sufficient finish and corrosion resistance can be provided.

It is also possible to conduct electrodeposition coating with omission of at least one of the industrial water washing step, tap water washing step, and pure water washing step, after chemical conversion treatment. For example, it is possible to conduct, after chemical conversion treatment, only pure water washing is performed before transfer to the electrodeposition coating step.

When the cationic electrodeposition coating composition (I) contains the amino group-containing modified epoxy resin (A) in an amount of 40 to 90 mass %, preferably 55 to 85 mass %, more preferably 60 to 80 mass %, relative to the resin solid content of the coating composition, it is possible to obtain a coated article excellent in finish and corrosion resistance even if chemical conversion coating solution is carried into the cationic electrodeposition coating composition (I) as a contaminant.

Coating of a metal substrate in accordance with the present invention can be conducted by immersing the metal substrate in an electrodeposition coating composition tank filled with the cationic electrodeposition coating composition (I) and applying electric current at a voltage of 50 to 400 V, preferably 100 to 370 V, more preferably 150 to 350 V, for 60 to 600 sec, preferably 120 to 480 sec, more preferably 150 to 360 sec, thereby forming an electrodeposition coating film on the chemical conversion coating film.

The electrodeposition coating with the cationic electrodeposition coating composition (I) can be performed at an inter-electrode distance of usually 0.1 to 5 m, preferably 0.2 to 3 m, more preferably 0.3 to 1 m and an anode/cathode ratio of 1/8 to 2/1, preferably 1/5 to 1/2.

The suitable bath temperature of the cationic electrodeposition coating composition is usually 5 to 45° C., preferably 10 to 40° C., more preferably 20 to 35° C. The deposited coating can be cured by baking. The suitable baking temperature is usually 100 to 200° C., preferably 120 to 180° C., on the surface of the coated article; and the baking time may be 5 to 90 min, preferably 10 to 50 min.

The cationic electrodeposition coating composition (I) may further contain, if necessary, other additives such as pigments, catalysts, organic solvents, pigment dispersants, surface conditioning agents, surfactants and the like, in amounts conventionally used in the field. Usable pigments and catalysts include, for example, coloring pigments such as titanium white, carbon black, etc.; extenders such as clay, talc, baryta, etc.; anticorrosion pigments such as aluminum dihydrogen tripolyphosphate, aluminum phosphomolybdate, etc.; organotin compounds such as dibutyltin oxide, dioctyltin oxide, etc.; and tin compounds such as aliphatic or aromatic carboxylates of dialkyltin, for example, dibutyltin dilaurate, dioctyltin dilaurate, dibutyltin diacetate, dioctyltin dibenzoate, dibutyltin dibenzoate, etc. Since the multilayer coating film obtained by the method of the present invention has excellent corrosion resistance, the curability of the multilayer coating film has good curability and excellent corrosion resistance even without containing an organotin compound.

The cationic electrodeposition coating composition (I) can be applied to the surface of a desired substrate by electrodeposition coating. The cationic electrodeposition is generally performed by preparing an electrodeposition bath containing the electrodeposition coating composition diluted with deionized water or the like to a solid concentration of about 5 to 40 mass % and adjusted to a pH of 5.5 to 9.0; adjusting the bath temperature to 15 to 35° C.; and applying electric current using the metal substrate as the cathode, under the above-mentioned conditions. Following the electrodeposition coating, the metal substrate is thoroughly washed with ultrafiltrate (UF), reverse osmosis water (RO water), industrial water, pure water or the like, to remove excess cationic electrodeposition coating composition adhering to the metal substrate.

The film thickness of the electrodeposition coating film is not particularly limited, but may generally be a dry thickness of 5 to 40 μm, preferably 12 to 30 μm. The coating film can be dried and baked by heating the electrodeposition coating using drying equipment such as an electric hot air drier, gas hot air drier or the like, to 110 to 200° C., preferably 140 to 180° C. on the surface of the metal substrate, for 10 to 180 min, preferably 20 to 50 min. The coating film can be cured by baking and drying as described above.

In the coating film (F1) of the multilayer coating film, the use of a specific metal compound composition, such as the metal compound component (M) in the first stage coating film forming agent (1) makes it possible to form the coating film (F1) with heretofore unachievable fine density. Even if a contaminant is mixed into the coating film forming agent (2), the coating film has excellent corrosion resistance and finish unaffected by the contaminant.

The coating film (F2) with fine density and excellent finish and corrosion resistance can be formed by immersing and electrodeposition-coating the metal substrate with the coating film (F1) in the coating film forming agent (2) containing the cationic resin composition as a main component. The excellent corrosion resistance can be achieved presumably because the function to block corrosion-promoting substances (e.g., $O_2$, $Cl^-$, $Na^+$) is imparted to the coating film structure.

EXAMPLES

The present invention will now be explained more specifically with reference to examples. However, the invention is in no way limited by the examples. In the examples, parts and percentages are by mass.

Production Examples of Amino Group-Containing Epoxy Resin (A) Using Poly(oxyalkylene)Glycol (a11)

Production Example 1A

Amino Group-Containing Epoxy Resin Solution No. 1A

In a separable flask with an inner volume of 2 l equipped with a thermometer, reflux condenser and stirrer, 602 parts of jER828EL (trade name of an epoxy resin produced by Japan Epoxy Resins Co., Ltd.), 178 parts of bisphenol A, 107 parts of PEG-400 (Note 1A) and 0.2 part of dimethylbenzylamine were added and reacted at 170° C. until the epoxy equivalent reached 800.

Next, 250 parts of ethylene glycol monobutyl ether and 113 parts of diethanolamine were added and the resultant mixture was allowed to react at 120° C. for 4 hours to obtain amino group-containing epoxy resin solution No. 1 having a resin solid content of 80 mass %. The obtained amino group-containing epoxy resin had an amine number of 60 mgKOH/g, a number average molecular weight of 1,900, and a proportion (%) of poly(oxyalkylene) chains of 10 mass %.

Production Examples 2A and 3A

Amino Group-Containing Epoxy Resin Solutions No. 2A and No. 3A

Amino group-containing epoxy resin solutions No. A2 and No. A3 were obtained in the manner of Production Example 1A except that the formulations were as shown in Table 1A.

TABLE 1A

|  |  | Prod. Ex. 1A | Prod. Ex. 2A | Prod. Ex. 3A |
|---|---|---|---|---|
| Amino group-containing epoxy resin solution |  | No. 1A | No. 2A | No. 3A |
| Formulation | jER828EL | 602 | 575 | 626 |
|  | Bisphenol A | 178 | 113 | 235 |
|  | PEG-400 (Note 1A) | 107 | 205 | 22 |

TABLE 1A-continued

|  |  | Prod. Ex. 1A | Prod. Ex. 2A | Prod. Ex. 3A |
|---|---|---|---|---|
|  | Diethanolamine | 113 | 107 | 117 |
|  | Ethylene glycol monobutyl ether | 250 | 250 | 250 |
| Characteristic value | Amine number (mgKOH/g) | 60 | 57 | 62 |
|  | Number average molecular weight | 1900 | 2000 | 1800 |
|  | Solid content | 80 | 80 | 80 |
| Proportion (%) of polyoxyalkylene chain (i) |  | 10 | 20 | 2 |

The formulations are expressed by parts by mass.
Note 1A
PEG-400: Trade name of polyethylene glycol, molecular weight 400, produced by Sanyo Chemical Industries, Ltd.

Production Examples of Amino Group-Containing Epoxy Resin (A) Using (Poly)oxyalkylene Adduct (a12) of Bisphenol A Production Example 4A Amino Group-Containing Epoxy Resin Solution No. 4A In a flask with an inner volume of 2 l equipped with a thermometer, reflux condenser and stirrer, 536 parts of jER828EL, 85 parts of bisphenol A, 279 parts of Newpol BPE-60 (Note 2A) and 0.8 part of tetrabutylammonium bromide were added and reacted at 180° C. until the epoxy equivalent reached 870.

Next, 250 parts of ethylene glycol monobutyl ether and 100 parts of diethanolamine were added and the resultant mixture was allowed to react at 120° C. for 4 hours to obtain amino group-containing epoxy resin solution No. 4A having a resin solid content of 80%.

The obtained amino group-containing epoxy resin No. 4A had an amine number of 54 mg/KOH/g, a number average molecular weight of 2,000, and a proportion (%) of poly (oxyalkylene) chains of 15 mass %.

Production Examples 5A and 6A

Amino Group-Containing Epoxy Resin Solutions No. 5A and No. 6A

Amino group-containing epoxy resin solutions No. 5A and No. 6A were obtained in the manner of Production Example 4A except that the formulations were as shown in Table 2A.

TABLE 2A

|  |  | Prod. Ex. 4A | Prod. Ex. 5A | Prod. Ex. 6A |
|---|---|---|---|---|
| Amino group-containing epoxy resin solution |  | No. 4A | No. 5A | No. 6A |
| Formulation | jER828EL | 536 | 449 | 617 |
|  | Bisphenol A | 85 | 78 | 256 |
|  | Newpol BPE-60 (Note 2A) | 279 |  |  |
|  | Newpol BPE-180 (Note 3A) |  | 369 | 29 |
|  | Diethanolamine | 100 | 104 | 98 |
|  | Ethylene glycol monobutyl ether | 250 | 250 | 250 |
| Characteristic value | Amine number (mgKOH/g) | 54 | 54 | 54 |

TABLE 2A-continued

|  |  | Prod. Ex. 4A | Prod. Ex. 5A | Prod. Ex. 6A |
|---|---|---|---|---|
|  | Number average molecular weight | 2000 | 2000 | 2000 |
|  | Solid content | 80 | 80 | 80 |
| Proportion (%) of polyoxyalkylene chain (i) |  | 15 | 28 | 2 |

The formulations were expressed by parts by mass.
Note 2A
Newpol BPE-60: Trade name of ethylene oxide adduct of bisphenol A, hydroxyl value of 228 mg KOH/g, produced by Sanyo Chemical Industries, Ltd.
Note 3A
Newpol BPE-180: Trade name of (poly)oxyalkylene adduct of bisphenol A, hydroxyl value of 109 mg KOH/g, produced by Sanyo Chemical Industries, Ltd.

Production Examples of Amino Group-Containing Epoxy Resin (A) Using Poly(oxyalkylene)Diglycidyl Ether (a13)

Production Example 7A

Amino Group-Containing Epoxy Resin Solution No. 7A

In a separable flask with an inner volume of 2 l equipped with a thermometer, reflux condenser and stirrer, 423 parts of jER828EL, 209 parts of Denacol EX-821 (Note 4A), 250 parts of bisphenol A and 0.2 part of dimethylbenzylamine were added and reacted at 130° C. until the epoxy equivalent reached 900.

Next, 250 parts of ethylene glycol monobutyl ether and 118 parts of diethanolamine were added and the resultant mixture was allowed to react at 120° C. for 4 hours to obtain amino group-containing epoxy resin solution No. 7A having a resin solid content of 80 mass %. The resin solids of amino group-containing epoxy resin No. 7A had an amine number of 63 mgKOH/g, a number average molecular weight of 1,800, and a proportion (%) of poly(oxyalkylene) chains of 10 mass %.

Production Examples 8A and 9A

Amino Group-Containing Epoxy Resin Solutions No. 8A and No. 9A

Amino group-containing epoxy resin solutions No. 8A and No. 9A were obtained in the manner of Production Example 7A except that the formulations were as shown in Table 3A.

TABLE 3A

|  |  | Prod. Ex. 7A | Prod. Ex. 8A | Prod. Ex. 9A |
|---|---|---|---|---|
| Amino group-containing epoxy resin solution |  | No. 7A | No. 8A | No. 9A |
| Formulation | jER828EL | 423 | 423 | 609 |
|  | Bisphenol A | 250 | 218 | 246 |
|  | Denacol EX-821 (Note 4A) | 209 |  |  |
|  | Denacol EX-841 (Note 5A) |  | 256 | 29 |
|  | Diethanolamine | 118 | 103 | 116 |
|  | Ethylene glycol monobutyl ether | 250 | 250 | 250 |
| Characteristic value | Amine number (mgKOH/g) | 63 | 55 | 62 |
|  | Number average molecular weight | 1800 | 2000 | 1800 |
|  | Solid content | 80 | 80 | 80 |

TABLE 3A-continued

|  |  | Prod. Ex. 7A | Prod. Ex. 8A | Prod. Ex. 9A |
|---|---|---|---|---|
| Proportion (%) of polyoxyalkylene chain (i) |  | 10 | 20 | 2 |

The formulations are expressed by parts by mass.
Note 4A
Denacol EX-821: Trade name of polyethylene glycol diglycidyl ether, epoxy equivalent of 185, produced by Nagase ChemteX Corporation
Note 5A
Denacol EX-841: Trade name of polyethylene glycol diglycidyl ether, epoxy equivalent of 372, produced by Nagase ChemteX Corporation Production Examples of Amino Group-Containing Epoxy Resin (A) Using Poly(oxyalkylene)Diamine (a14)

Production Example 10A

Amino Group-Containing Epoxy Resin Solution No. 10A

In a separable flask with an inner volume of 2 l equipped with a thermometer, reflux condenser and stirrer, 527 parts of jER828EL, 169 parts of bisphenol A, and 0.2 part of dimethylbenzylamine were added and reacted at 130° C. for 1 hour, and then 152 parts of JEFFAMINE ED-600 (Note 6A) was added the resultant mixture was allowed to react with the same temperature maintained until the epoxy equivalent reached 900.

Next, 250 parts of ethylene glycol monobutyl ether and 107 parts of diethanolamine were added and the resultant mixture was allowed to react at 120° C. for 4 hours to obtain amino group-containing epoxy resin solution No. 10 having a resin solid content of 80 mass %. Amino group-containing epoxy resin No. 10A had an amine number of 57 mgKOH/g, a number average molecular weight of 2,000, and a proportion (%) of poly(oxyalkylene) chains of 10 mass %.

Production Examples 11A and 12A

Amino Group-Containing Epoxy Resin Solutions No. 11A and No. 12A

Amino group-containing epoxy resin solutions No. 11A and No. 12A were obtained in the manner of Production Example 10A except that the formulations were as shown in Table 4A.

TABLE 4A

|  |  | Prod. Ex. 10A | Prod. Ex. 11A | Prod. Ex. 12A |
|---|---|---|---|---|
| Amino group-containing epoxy resin solution |  | No. 10A | No. 11A | No. 12A |
| Formulation | jER828EL | 527 | 549 | 618 |
|  | Bisphenol A | 169 | 173 | 237 |
|  | JEFFAMINE ED-600 (Note 6A) | 152 |  |  |
|  | JEFFAMINE ED-900 (Note 7A) |  | 176 | 30 |
|  | Diethanolamine | 107 | 102 | 115 |
|  | Ethylene glycol monobutyl ether | 250 | 250 | 250 |
| Characteristic value | Amine number (mgKOH/g) | 57 | 55 | 60 |
|  | Number average molecular weight | 2000 | 2000 | 1800 |
|  | Solid content | 80 | 80 | 80 |

TABLE 4A-continued

|  | Prod. Ex. 10A | Prod. Ex. 11A | Prod. Ex. 12A |
|---|---|---|---|
| Proportion (%) of polyoxyalkylene chain (i) | 10 | 10 | 2 |

The formulations were expressed by parts by mass.
Note 6A
JEFFAMINE ED-600: Trade name of polyethylene glycol polypropylene glycol diamine, molecular weight of 600, produced by Huntsman Corporation
Note 7A
JEFFAMINE ED-900: Trade name of polyethylene glycol polypropylene glycol diamine, molecular weight of 900, produced by Huntsman Corporation Production Examples of Amino Group-Containing Epoxy Resin (A) Using Isocyanate (a15)

Production Example 13A

TDI Prepolymer

In a separable flask with an inner volume of 2 l equipped with a thermometer, reflux condenser and stirrer, 800 parts of Cosmonate T-80 (Note 8A) and 200.0 parts of MPG-081 (Note 9A) were added, and reacted at 80° C. until the NCO equivalent reached 870 mg/eq, thereby obtaining TDI prepolymer.

Note 8A
Cosmonate T-80: Trade name of tolylenediisocyanate produced by Mitsui Chemicals Polyurethanes, Inc.

Note 9A
MPG-081: Trade name of polyethylene glycol monomethyl ether, hydroxyl value of 81 mg KOH/g, produced by Nippon Nyukazai Co.

Production Example 14A

In a separable flask with an inner volume of 2 l equipped with a thermometer, reflux condenser and stirrer, 549 parts of jER828EL, 217 parts of bisphenol A, and 0.2 part of dimethylbenzylamine were added and reacted at 130° C. until the epoxy equivalent reached 780.

Next, 131 parts of the TDI prepolymer obtained in Production Example 13A was added and the resultant mixture was allowed to react at 120° C. until the NCO value fell to or below 1 mg NCO/g.

Next, 250 parts of ethylene glycol monobutyl ether and 103 parts of diethanolamine were added and the resultant mixture was allowed to react at 120° C. for 4 hours to obtain amino group-containing epoxy resin solution No. 13A having a resin solid content of 80 mass %. The resin solids of amino group-containing epoxy resin No. 13A had an amine number of 55 mgKOH/g, a number average molecular weight of 2,000, and a proportion (%) of poly(oxyalkylene) chains of 10 mass %.

Production Examples 15A and 16A

Amino Group-Containing Epoxy Resin Solutions No. 14A and No. 15A

Amino group-containing epoxy resin solutions No. 14A and No. 15A were obtained in the manner of Production Example 14A except that the formulations were as shown in Table 5A.

TABLE 5A

|  |  | Prod. Ex. 14A | Prod. Ex. 15A | Prod. Ex. 16A |
|---|---|---|---|---|
| Amino group-containing epoxy resin solution |  | No. 13A | No. 14A | No. 15A |
| Formulation | jER828EL | 549 | 468 | 614 |
|  | Bisphenol A | 217 | 185 | 242 |
|  | TDI prepolymer | 131 | 260 | 28 |
|  | Diethanolamine | 103 | 87 | 115 |
|  | Ethylene glycol monobutyl ether | 250 | 250 | 250 |
| Characteristic value | Amine number (mgKOH/g) | 55 | 47 | 61 |
|  | Number average molecular weight | 2000 | 2400 | 1830 |
|  | Solid content | 80 | 80 | 80 |
| Proportion (%) of polyoxyalkylene chain (i) |  | 10 | 20 | 2 |

The formulations are expressed by parts by mass.

Production of Curing Agent

Production Example 17A

Curing Agent No. 1A 44 parts of methyl isobutyl ketone was added to 222 parts of isophorone diisocyanate, and the temperature was elevated to 70° C. Next, 174 parts of methyl ethyl ketoxime was added dropwise over a period of 2 hours. With the temperature maintained, sampling was performed over the course of time to ascertain termination of unreacted isocyanate absorption by infrared absorption spectral analysis, whereby a blocked polyisocyanate compound having a solid content of 90% was obtained as curing agent No. 1A.

Production of Emulsions

Production Example 18A

Emulsion No. 1A 87.5 parts (solid content: 70.0 parts) of amino group-containing epoxy resin No. 1A having a resin solid content of 80% obtained in Production Example 1A, 33.3 parts (solid content: 30.0 parts) of curing agent No. 1A obtained in Production Example 17A and 10.7 parts of 10% formic acid were blended and stirred to uniformity, and then 181 parts of deionized water was added dropwise over about 15 min under vigorous stirring to obtain emulsion No. 1A having a solid content of 32.0%.

Production Examples 19A to 32A

Emulsions No. 2A to No. 15A

Emulsions No. 2A to No. 15A each having a solid content of 32.0% were obtained in the manner of Production Example 18A except that the formulations were as shown in Tables 6A and 7A.

TABLE 6A

| | | | Prod. Ex. 18A | Prod. Ex. 19A | Prod. Ex. 20A | Prod. Ex. 21A | Prod. Ex. 22A | Prod. Ex. 23A | Prod. Ex. 24A | Prod. Ex. 25A | Prod. Ex. 26A |
|---|---|---|---|---|---|---|---|---|---|---|---|
| | | Emulsion | No. 1A | No. 2A | No. 3A | No. 4A | No. 5A | No. 6A | No. 7A | No. 8A | No. 9A |
| Resin component | Base resin | Amino group-containing epoxy resin solution No. 1A | 87.5 (70) | | | | | | | | |
| | | Amino group-containing epoxy resin solution No. 2A | | 87.5 (70) | | | | | | | |
| | | Amino group-containing epoxy resin solution No. 3A | | | 87.5 (70) | | | | | | |
| | | Amino group-containing epoxy resin solution No. 4A | | | | 87.5 (70) | | | | | |
| | | Amino group-containing epoxy resin solution No. 5A | | | | | 87.5 (70) | | | | |
| | | Amino group-containing epoxy resin solution No. 6A | | | | | | 87.5 (70) | | | |
| | | Amino group-containing epoxy resin solution No. 7A | | | | | | | 87.5 (70) | | |
| | | Amino group-containing epoxy resin solution No. 8A | | | | | | | | 87.5 (70) | |
| | | Amino group-containing epoxy resin solution No. 9A | | | | | | | | | 87.5 (70) |
| | Cross-linking agent | Curing agent Solid content 90% | 33.3 (30) | 33.3 (30) | 33.3 (30) | 33.3 (30) | 33.3 (30) | 33.3 (30) | 33.3 (30) | 33.3 (30) | 33.3 (30) |
| Neutralizing agent | | 10% Formic acid | 10.7 | 10.7 | 10.7 | 10.7 | 10.7 | 10.7 | 10.7 | 10.7 | 10.7 |
| | | Deionized water | 181.0 | 181.0 | 181.0 | 181.0 | 181.0 | 181.0 | 181.0 | 181.0 | 181.0 |
| | | 32% Emulsion | 312.5 (100) | 312.5 (100) | 312.5 (100) | 312.5 (100) | 312.5 (100) | 312.5 (100) | 312.5 (100) | 312.5 (100) | 312.5 (100) |

The numerals indicate the amounts added; the parenthesized numerals indicate solid contents.

TABLE 7A

| | | | Prod. Ex. 27A | Prod. Ex. 28A | Prod. Ex. 29A | Prod. Ex. 30A | Prod. Ex. 31A | Prod. Ex. 32A |
|---|---|---|---|---|---|---|---|---|
| | | Emulsion | No. 10A | No. 11A | No. 12A | No. 13A | No. 14A | No. 15A |
| Resin component | Base resin | Amino group-containing epoxy resin solution No. 10A | 87.5 (70) | | | | | |
| | | Amino group-containing epoxy resin solution No. 11A | | 87.5 (70) | | | | |
| | | Amino group-containing epoxy resin solution No. 12A | | | 87.5 (70) | | | |
| | | Amino group containing epoxy resin solution No. 13A | | | | 87.5 (70) | | |
| | | Amino group-containing epoxy resin solution No. 14A | | | | | 87.5 (70) | |
| | | Amino group-containing epoxy resin solution No. 15A | | | | | | 87.5 (70) |
| | Cross-linking agent | Curing agent Solid content 90% | 33.3 (30) | 33.3 (30) | 33.3 (30) | 33.3 (30) | 33.3 (30) | 33.3 (30) |
| Neutralizing agent | | 10% Formic acid | 10.7 | 10.7 | 10.7 | 10.7 | 10.7 | 10.7 |
| | | Deionized water | 181.0 | 181.0 | 181.0 | 181.0 | 181.0 | 181.0 |
| | | 32% Emulsion | 312.5 (100) | 312.5 (100) | 312.5 (100) | 312.5 (100) | 312.5 (100) | 312.5 (100) |

The numerals indicate the amounts added; the parenthesized numerals indicate solid contents.

Production Example 33A

Pigment Dispersing Resin

To 1,010 parts of jER828EL (trade name of epoxy resin produced by Epoxy Resin Co.) were added 390 parts of bisphenol A, 240 parts of PLACCEL 212 (trade name of polycaprolactonediol, weight average molecular weight of about 1,250, produced by Daicel Chemical Industries) and 0.2 part of dimethylbenzylamine, and the resultant mixture was allowed to react at 130° C. until the epoxy equivalent became about 1,090.

Next, 134 parts of dimethylethanolamine, 150 parts of aqueous solution of lactic acid of 90% concentration were added and the resultant mixture was allowed to react at 120° C. for 4 hours. The solid content was then adjusted by addition of methyl isobutyl ketone to obtain an ammonium salt resin-based pigment dispersing resin having a solid content of 60%.

Production Example 34A

Pigment-Dispersed Paste No. 1

8.3 parts (solid content: 5.0 parts) of the pigment dispersing resin having a solid content of 60% obtained in Production Example 33A, 14.0 parts (solid content 14.0 parts) of JR-600E (Note 10A), 0.3 part (solid content: 0.3 part) of Carbon MA-7 (Note 11A), 9.7 parts (solid content: 9.7 parts) of Hydrite PXN (Note 12A), 1.0 part (solid content: 1.0 part) of dioctyltin oxide and 23.3 parts of deionized water were blended and dispersed to obtain pigment-dispersed paste No. 1 having a solid content of 55 mass %.

Note 10A
JR-600E: trade name of titanium white produced by Tayca Corporation

Note 11A
Carbon MA-7: trade name of carbon black produced by Mitsubishi Chemical Co.

Note 12A
Hydrite PXN: trade name of kaolin produced by Georgia Kaolin Co.

Production Example 35A

Chemical Conversion Treatment Agent A (Zinc Phosphate-Based Chemical Conversion Coating Solution)

Chemical conversion treatment agent A of the following composition was prepared and used in the Examples and Comparative Examples.

Composition of Chemical Conversion Treatment Agent A

| | |
|---|---|
| $Zn^{2+}$ | 1.5 g/l |
| $Ni^{2+}$ | 0.5 g/l |
| $PO_4^{3-}$ | 13.5 g/l |
| $F^-$ | 0.5 g/l |
| $NO^{3-}$ | 6.0 g/l |
| $NO^{2-}$ | 0.1 g/l |
| $Na^+$ | 1.5 g/l |

Production Example 36A

Chemical Conversion Treatment Agent B (Zirconium-Based Chemical Conversion Coating Solution)

Chemical conversion treatment agent B of the following composition was prepared and used in the Examples and Comparative Examples.

Composition of Chemical Conversion Treatment Agent B

Hexafluorozirconic acid, aluminum nitrate and calcium nitrate were blended so as to obtain a chemical conversion treatment agent containing 2,000 ppm of zirconium, 100 ppm of aluminum and 100 ppm of calcium as metallic elements, and the agent was adjusted to pH 4 with hydrofluoric acid and ammonia.

Production Example 37A 312.5 parts (solid content: 100.0 parts) of emulsion No. 1A having a solid content of 32% obtained in Production Example 18A, 54.5 parts (solid content: 30.0 parts) of 55% pigment-dispersed paste No. 1 obtained in Production Example 34, and 283.0 parts of deionized water were blended to obtain electrodeposition coating composition No. 1A having a solid content of 20%.

Production Examples 38A to 46A

Electrodeposition coating compositions No. 2 to No. 10 were obtained in the manner of Production Example 37A except that the formulations were as shown in Table 8A.

TABLE 8A

| | Prod. Ex. 37A | Prod. Ex. 38A | Prod. Ex. 39A | Prod. Ex. 40A | Prod. Ex. 41A | Prod. Ex. 42A | Prod. Ex. 43A | Prod. Ex. 44A | Prod. Ex. 45A | Prod. Ex. 46A |
|---|---|---|---|---|---|---|---|---|---|---|
| Electrodeposition coating composition | No. 1A | No. 2A | No. 3A | No. 4A | No. 5A | No. 6A | No. 7A | No. 8A | No. 9A | No. 10A |
| Emulsion No. 1A | 312.5 (100.0) | — | — | — | — | — | — | — | — | — |
| Emulsion No. 2A | — | 312.5 (100.0) | — | — | — | — | — | — | — | — |
| Emulsion No. 4A | — | — | 312.5 (100.0) | — | — | — | — | — | — | — |
| Emulsion No. 5A | — | — | — | 312.5 (100.0) | — | — | — | — | — | — |
| Emulsion No. 7A | — | — | — | — | 312.5 (100.0) | — | — | — | — | — |
| Emulsion No. 8A | — | — | — | — | — | 312.5 (100.0) | — | — | — | — |
| Emulsion No. 10A | — | — | — | — | — | — | 312.5 (100.0) | — | — | — |
| Emulsion No. 11A | — | — | — | — | — | — | — | 312.5 (100.0) | — | — |
| Emulsion No. 13A | — | — | — | — | — | — | — | — | 312.5 (100.0) | — |
| Emulsion No. 14A | — | — | — | — | — | — | — | — | — | 312.5 (100.0) |
| Pigment-dispersed Paste | 54.5 (30.0) | 54.5 (30.0) | 54.5 (30.0) | 54.5 (30.0) | 54.5 (30.0) | 54.5 (30.0) | 54.5 (30.0) | 54.5 (30.0) | 54.5 (30.0) | 54.5 (30.0) |
| Deionized water | 283.0 | 283.0 | 283.0 | 283.0 | 283.0 | 283.0 | 283.0 | 283.0 | 283.0 | 283.0 |

TABLE 8A-continued

|  | Prod. Ex. 37A | Prod. Ex. 38A | Prod. Ex. 39A | Prod. Ex. 40A | Prod. Ex. 41A | Prod. Ex. 42A | Prod. Ex. 43A | Prod. Ex. 44A | Prod. Ex. 45A | Prod. Ex. 46A |
|---|---|---|---|---|---|---|---|---|---|---|
| 20% Bath | 650.0 (130.0) | 650.0 (130.0) | 650.0 (130.0) | 650.0 (130.0) | 650.0 (130.0) | 650.0 (130.0) | 650.0 (130.0) | 650.0 (130.0) | 650.0 (130.0) | 650.0 (130.0) |
| Contaminant ion intrusion (Note 13A) | A | A | A | A | A | A | A | A | A | A |

Production Example 47A 312.5 parts (solid content 100.0 parts) of emulsion No. 3A having a solid content of 32%, 54.5 parts (solid content 30.0 parts) of the 55% pigment-dispersed paste obtained in Production Example 34A, and 283.0 parts of deionized water were mixed to obtain electrodeposition coating composition No. 11A having a solid content of 20%.

Production Examples 48A to 51A

Electrodeposition coating compositions No. 12A to No. 15A were obtained in the manner of Production Example 47A except that the formulations were as shown in Table 9A.

TABLE 9A

|  | Prod. Ex. 47A | Prod. Ex. 48A | Prod. Ex. 49A | Prod. Ex. 50A | Prod. Ex. 51A |
|---|---|---|---|---|---|
| Electrodeposition coating composition | No. 11A | No. 12A | No. 13A | No. 14A | No. 15A |
| Emulsion No. 3A | 312.5 (100.0) | — | — | — | — |
| Emulsion No. 6A | — | 312.5 (100.0) | — | — | — |
| Emulsion No. 9A | — | — | 312.5 (100.0) | — | — |
| Emulsion No. 12A | — | — | — | 312.5 (100.0) | — |
| Emulsion No. 15A | — | — | — | — | 312.5 (100.0) |
| Pigment-dispersed paste No. 1A | 54.5 (30.0) | 54.5 (30.0) | 54.5 (30.0) | 54.5 (30.0) | 54.5 (30.0) |
| Deionized water | 283.0 | 283.0 | 283.0 | 283.0 | 283.0 |
| 20% Bath | 650.0 (130.0) | 650.0 (130.0) | 650.0 (130.0) | 650.0 (130.0) | 650.0 (130.0) |
| Contaminant ion intrusion (Note 13A) | B | B | B | B | C |

Note 13A
Contaminant ion intrusion: The chemical conversion coating solution obtained in Production Example 35A was added to each electrodeposition coating compositions so that the zinc metal concentration became 0.03 g/l.
A bath of the above electrodeposition coating composition was regulated to 28° C., and zinc-phosphate-treated cold-rolled steel sheet (Palbond 3020L-SPC) was immersed therein as the cathode and electrodeposition-coated to a dry film thickness of 20 μm. The coating was baked in an electric drier at 170° C. for 20 min, and thereafter the coating surface finish was evaluated.
A: Excellent coating surface.
B: One or more coating defects among uneven gloss, pinholes and orange peel were present.
C: One or more coating defects among uneven gloss, pinholes and orange peel were markedly present.

Electrodeposition Coating Step "Without Water Washing" After Chemical Conversion Treatment Example 1A Test panel No. 1A was obtained by the following Steps 1 to 3.

Step 1 (pretreatment): A cold-rolled steel panel (70 mm×150 mm×0.8 mm) was treated by immersion for 120 sec in 2-mass % FINECLEANER L4460 (alkaline degreaser from Nihon Parkerizing Co.) adjusted to 43° C.

Surface conditioning was conducted by immersion in 0.15% aqueous solution of PREPAREN 4040N (surface conditioning agent from Nihon Parkerizing Co.) at room temperature for 30 sec.

Spray washing was conducted for 30 sec using tap water. The spray-washed panel was treated by immersion for 120 sec in chemical conversion treatment agent A of Production Example 35A adjusted to 43° C., and then, without water washing (none of industrial water washing, tap water washing and pure water washing was performed), transferred to the electrodeposition coating step.

Step 2 (electrodeposition coating): The panel was immersed in a bath of electrodeposition coating composition No. 1A adjusted to 28° C. and electrodeposition coating was conducted at 250 V (voltage rise period: 30 sec) for 180 sec. The operations of Steps 1 and 2 were repeated until the concentration of $Zn^{2+}$ in the electrodeposition coating composition became about 0.03 g/l as measured by ICP analysis (Note 14A), whereupon the panel was transferred to Step 3.

Step 3 (baking and drying): Baking was conducted for 20 min at 170° C. in an electric drier to obtain a dry film thickness of 20 μm.

Note 14A
ICP analysis: The metallic element concentration in the electrodeposition coating composition was determined by ICP analysis (induced plasma atomic emission spectrometry) using a Shimadzu Model ICPS-8000.

Examples 2A to 10A

Test panels No. 2A to No. 10A were obtained in the manner of Example 1A except that the electrodeposition coating compositions and coating conditions shown in Table 10A were adopted.

Example 11A

Test panel No. 11A was obtained by the following Steps 1 to 3.

Step 1 (pretreatment): A cold-rolled steel panel (70 mm×150 mm×0.8 mm) was treated by immersion for 120 sec in 2-mass % FINECLEANER L4460 (alkaline degreaser from Nihon Parkerizing Co.) adjusted to 43° C.

Surface conditioning was conducted by immersion in 0.15% aqueous solution of PREPAREN 4040N (surface conditioning agent from Nihon Parkerizing Co.) at room temperature for 30 sec. Spray washing was then conducted for 30 sec using tap water.

The spray-washed panel was treated by immersion for 120 sec in chemical conversion treatment agent B of Production Example 36 adjusted to 40° C., and then, without washing (none of industrial water washing, tap water washing and pure water washing was performed), transferred to the electrodeposition coating step.

Step 2 (electrodeposition coating): The panel was immersed in a bath of electrodeposition coating composition No. 1. adjusted to 28° C. and electrodeposition coating was conducted at 250 V (voltage rise period: 30 sec) for 180 sec. The operations of Steps 1 and 2 were repeated until the concentration of zirconium metal in the electrodeposition coating composition became about 0.03 g/l as measured by ICP analysis (see Note 14A), whereupon the panel was sent to Step 3.

Step 3 (baking and drying): Baking was conducted for 20 min at 170° C. in an electric drier to obtain a dry film thickness of 20 μm.

Example 12A

Test panel No. 12A was obtained in the manner of Example 11A except that the electrodeposition coating composition and coating conditions shown in Table 10A were adopted.

TABLE 10A

| | | | Ex. 1A | Ex. 2A | Ex. 3A | Ex. 4A | Ex. 5A | Ex. 6A |
|---|---|---|---|---|---|---|---|---|
| | | Test panel | No. 1A | No. 2A | No. 3A | No. 4A | No. 5A | No. 6A |
| Step 1 Pretreatment | Substrate | | Cold-rolled steel panel | Cold-rolled steel panel | Cold-rolled steel panel | Cold-rolled steel panel | Cold-rolled steel panel | Cold-rolled steel panel |
| | Degreasing | | FINECLEANER L4460 | FINECLEANER L4460 | FINECLEANER L4460 | FINECLEANER L4460 | FINECLEANER L4460 | FINECLEANER L4460 |
| | Surface conditioning | | PREPAREN 4040N | PREPAREN 4040N | PREPAREN 4040N | PREPAREN 4040N | PREPAREN 4040N | PREPAREN 4040N |
| | Chemical conversion treatment agent | | A | A | A | A | A | A |
| | Water washing | | No | No | No | No | No | No |
| Step 2 Electro-deposition | Electrodeposition coating composition | | No. 1A | No. 2A | No. 3A | No. 4A | No. 5A | No. 6A |
| | Voltage (V) | | 250 | 250 | 250 | 250 | 250 | 250 |
| | Sec | | 180 | 180 | 180 | 180 | 180 | 180 |
| Step 3 | Drying (170° C.) | | 20 min | 20 min | 20 min | 20 min | 20 min | 20 min |
| Corrosion resistance | (Note 15A) | | A | B | A | B | A | B |
| Weathering resistance | (Note 16A) | | A | B | A | B | A | B |
| Finish | (Note 17A) | | B | B | B | B | B | B |

| | | | Ex. 7A | Ex. 8A | Ex. 9A | Ex. 10A | Ex. 11A | Ex. 12A |
|---|---|---|---|---|---|---|---|---|
| | | Test panel | No. 7A | No. 8A | No. 9A | No. 10A | No. 11A | No. 12A |
| Step 1 Pretreatment | Substrate | | Cold-rolled steel panel | Cold-rolled steel panel | Cold-rolled steel panel | Cold-rolled steel panel | Cold-rolled steel panel | Cold-rolled steel panel |
| | Degreasing | | FINECLEANER L4460 | FINECLEANER L4460 | FINECLEANER L4460 | FINECLEANER L4460 | FINECLEANER L4460 | FINECLEANER L4460 |
| | Surface conditioning | | PREPAREN 4040N | PREPAREN 4040N | PREPAREN 4040N | PREPAREN 4040N | PREPAREN 4040N | PREPAREN 4040N |
| | Chemical conversion treatment agent | | A | A | A | A | B | B |
| | Water washing | | No | No | No | No | No | No |
| Step 2 Electro-deposition | Electrodeposition coating composition | | No. 7A | No. 8A | No. 9A | No. 10A | No. 1A | No. 3A |
| | Voltage (V) | | 250 | 250 | 250 | 250 | 250 | 250 |
| | Sec | | 180 | 180 | 180 | 180 | 180 | 180 |
| Step 3 | Drying (170° C.) | | 20 min | 20 min | 20 min | 20 min | 20 min | 20 min |
| Corrosion resistance | (Note 15A) | | A | B | A | B | A | A |
| Weathering resistance | (Note 16A) | | A | B | A | B | A | A |
| Finish | (Note 17A) | | B | B | B | B | B | B |

Comparative Example 1A

Test panel No. 13A was obtained by the following Steps 1 to 3.

Step 1 (pretreatment): A cold-rolled steel panel (70 mm×150 mm×0.8 mm) was treated by immersion for 120 sec in 2-mass % FINECLEANER L4460 (alkaline degreaser from Nihon Parkerizing Co.) adjusted to 43° C.

Surface conditioning was conducted by immersion in 0.15% aqueous solution of PREPAREN 4040N (surface conditioning agent from Nihon Parkerizing Co.) at room temperature for 30 sec.

Spray-washing was then conducted for 30 sec using tap water. The spray-washed panel was treated by immersion for 120 sec in chemical conversion treatment agent A of Production Example 35 adjusted to 43° C.

Then, without water washing (none of industrial water washing, tap water washing and pure water washing was performed), the panel was transferred to the electrodeposition coating step.

Step 2 (electrodeposition coating): The panel was immersed in a bath of electrodeposition coating composition No. 11A adjusted to 28° C. and electrodeposition coating was conducted at 250 V (voltage rise period: 30 sec) for 180 sec. The operations of Steps 1 and 2 were repeated until the concentration of zinc metal in the electrodeposition coating composition became about 0.03 g/l as measured by ICP analysis (Note 14A), whereupon the panel was sent to Step 3.

Step 3 (baking and drying): The coating obtained was washed with water and then baked at 170° C. for 20 min in an electric drier to obtain a dry film thickness of 20 μm.

Comparative Examples 2A to 5A

Test panels No. 14A to No. 17A were obtained in the manner of Comparative Example 6A except that the electrodeposition coating compositions and steps shown in Table 11A were adopted. The test results are also shown in Table 11A.

Comparative Example 6A

Test panel No. 18A was obtained by the following Steps 1 to 3.

Step 1 (pretreatment): A cold-rolled steel panel (70 mm×150 mm×0.8 mm) was treated by immersion for 120 sec in 2-mass % FINECLEANER L4460 (alkaline degreaser from Nihon Parkerizing Co.) adjusted to 43° C.

Surface conditioning was conducted by immersion in 0.15% aqueous solution of PREPAREN 4040N (surface conditioning agent from Nihon Parkerizing Co.) at room temperature for 30 sec. Spray-washing was then conducted for 30 sec using tap water.

The spray-washed panel was treated by immersion for 120 sec in chemical conversion treatment agent B of Production Example 36A adjusted to 40° C., and then, without water washing (none of industrial water washing, tap water washing and pure water washing was performed), transferred to the electrodeposition coating step.

Step 2 (electrodeposition coating): The panel was immersed in a bath of electrodeposition coating composition No. 11A adjusted to 28° C. and electrodeposition coating was conducted at 250 V (voltage rise period: 30 sec) for 180 sec. The operations of Steps 1 and 2 were repeated until the concentration of zirconium metal in the electrodeposition coating composition became about 0.03 g/l as measured by ICP analysis (see Note 14A), whereupon the panel was sent to Step 3.

Step 3 (baking and drying): Baking was conducted for 20 min at 170° C. in an electric drier to obtain a dry film thickness of 20 μm.

Comparative Example 7A

Test panel No. 19A was obtained in the manner of Comparative Example 6A except that the electrodeposition coating composition and coating conditions shown in Table 11A were adopted.

TABLE 11A

| | | Comp. Ex. 1A | Comp. Ex. 2A | Comp. Ex. 3A | Comp. Ex. 4A | Comp. Ex. 5A | Comp. Ex. 6A | Comp. Ex. 7A |
|---|---|---|---|---|---|---|---|---|
| | Test panel | No. 13A | No. 14A | No. 15A | No. 16A | No. 17A | No. 18A | No. 19A |
| Step 1 Pretreatment | Substrate | Cold-rolled steel panel | Cold-rolled steel panel | Cold-rolled steel panel | Cold-rolled steel panel | Cold-rolled steel panel | Cold-rolled steel panel | Cold-rolled steel panel |
| | Degreasing | FINE-CLEANER L4460 | FINE-CLEANER L4460 | FINE-CLEANER L4460 | FINE-CLEANER L4460 | FINE-CLEANER L4460 | FINE-CLEANER L4460 | FINE-CLEANER L4460 |
| | Surface conditioning | PREPAREN 4040N | PREPAREN 4040N | PREPAREN 4040N | PREPAREN 4040N | PREPAREN 4040N | PREPAREN 4040N | PREPAREN 4040N |
| | Chemical conversion treatment agent | A | A | A | A | A | B | B |
| | Water washing | No | No | No | No | No | No | No |
| Step 2 Electro-deposition | Electrodeposition coating composition | No. 11A | No. 12A | No. 13A | No. 14A | No. 15A | No. 11A | No. 13A |
| | Voltage (V) | 250 | 250 | 250 | 250 | 250 | 250 | 250 |
| | Sec | 180 | 180 | 180 | 180 | 180 | 180 | 180 |
| Step 3 | Drying (170° C.) | 20 min | 20 min | 20 min | 20 min | 20 min | 20 min | 20 min |
| Corrosion resistance | (Note 15A) | C | C | C | C | C | C | C |
| Weathering resistance | (Note 16A) | D | D | D | D | D | D | D |
| Finish | (Note 17A) | C | C | C | C | D | C | C |

Electrodeposition Coating Step "With Water Washing" After Chemical Conversion Treatment Comparative Example 8A Test panel No. 20A was obtained by the following Steps 1 to 3.

Step 1 (pretreatment): A cold-rolled steel panel (70 mm×150 mm×0.8 mm) was treated by immersion for 120 sec in 2-mass % FINECLEANER L4460 (alkaline degreaser from Nihon Parkerizing Co.) adjusted to 43° C.

Surface conditioning was conducted by immersion in 0.15% aqueous solution of PREPAREN 4040N (surface conditioning agent from Nihon Parkerizing Co.) at room temperature for 30 sec.

Spray-washing was then conducted for 30 sec using tap water. The spray-washed panel was treated by immersion for 120 sec in chemical conversion treatment agent A of Production Example 35A adjusted to 43° C.

The panel was then washed (industrial water washing, tap water washing and pure water washing) and transferred to the electrodeposition coating step.

Step 2 (electrodeposition coating): The panel was immersed in a bath of electrodeposition coating composition No. 11A adjusted to 28° C. and electrodeposition coating was conducted at 250 V (voltage rise period: 30 sec) for 180 sec. The metal ion concentration of the electrodeposition coating composition at this point was measured by ICP analysis but no zinc metal concentration was detected.

Step 3 (baking and drying): The coating obtained was washed with water, and then baked at 170° C. for 20 min in an electric drier to obtain a dry film thickness of 20 μm.

Comparative Examples No. 9A to No. 17A

Test panels No. 21A to No. 29A were obtained in the manner of Comparative Example 11A except that the electrodeposition coating compositions and steps shown in Table 12A were adopted.

Comparative Example 18A

Test panel No. 30A was obtained by the following Steps 1 to 3.

Step 1 (pretreatment): A cold-rolled steel panel (70 mm×150 mm×0.8 mm) was treated by immersion for 120 sec in 2-mass % FINECLEANER L4460 (alkaline degreaser from Nihon Parkerizing Co.) adjusted to 43° C.

Surface conditioning was conducted by immersion in 0.15% aqueous solution of PREPAREN 4040N (surface conditioning agent from Nihon Parkerizing Co.) at room temperature for 30 sec. Spray-washing was then conducted for 30 sec using tap water.

The spray-washed panel was treated by immersion for 120 sec in chemical conversion treatment agent B of Production Example 36A adjusted to 40° C., then washed with water, and transferred to the electrodeposition coating step.

Step 2 (electrodeposition coating): The panel was immersed in a bath of electrodeposition coating composition No. 1 adjusted to 28° C. and electrodeposition coating was conducted at 250 V (voltage rise period: 30 sec) for 180 sec. The operations of Steps 1 and 2 were repeated until the concentration of zirconium in the electrodeposition coating composition became about 0.03 g/l as measured by ICP analysis (see Note 14A), whereupon the panel was sent to Step 3.

Step 3 (baking and drying): The coating obtained was baked at 170° C. for 20 min in an electric drier to obtain a dry film thickness of 20 μm.

Comparative Example 19A

Test panel No. 31A was obtained in the manner of Comparative Example 18A except that the electrodeposition coating composition and coating conditions shown in Table 12A were adopted.

TABLE 12A

| | | Comp. Ex. 8A | Comp. Ex. 9A | Comp. Ex. 10A | Comp. Ex. 11A | Comp. Ex. 12A | Comp. Ex. 13A |
|---|---|---|---|---|---|---|---|
| | Test panel | No. 20A | No. 21A | No. 22A | No. 23A | No. 24A | No. 25A |
| Step 1 Pretreatment | Substrate | Cold-rolled steel panel | Cold-rolled steel panel | Cold-rolled steel panel | Cold-rolled steel panel | Cold-rolled steel panel | Cold-rolled steel panel |
| | Degreasing | FINECLEANER L4460 | FINECLEANER L4460 | FINECLEANER L4460 | FINECLEANER L4460 | FINECLEANER L4460 | FINECLEANER L4460 |
| | Surface conditioning | PREPAREN 4040N | PREPAREN 4040N | PREPAREN 4040N | PREPAREN 4040N | PREPAREN 4040N | PREPAREN 4040N |
| | Chemical conversion treatment agent | A | A | A | A | A | A |
| | Water washing | Yes | Yes | Yes | Yes | Yes | Yes |
| Step 2 Electro-deposition | Electrodeposition coating composition | No. 11A | No. 12A | No. 13A | No. 14A | No. 15A | No. 1A |
| | Voltage (V) | 250 | 250 | 250 | 250 | 250 | 250 |
| | Sec | 180 | 180 | 180 | 180 | 180 | 180 |
| Step 3 | Drying (170° C.) | 20 min | 20 min | 20 min | 20 min | 20 min | 20 min |
| Corrosion resistance | (Note 15A) | A | A | A | A | A | A |
| Weathering resistance | (Note 16A) | A | A | A | A | A | A |
| Finish | (Note 17A) | B | B | B | B | B | B |

TABLE 12A-continued

|  |  | Comp. Ex. 14A | Comp. Ex. 15A | Comp. Ex. 16A | Comp. Ex. 17A | Comp. Ex. 18A | Comp. Ex. 19A |
|---|---|---|---|---|---|---|---|
|  | Test panel | No. 26A | No. 27A | No. 28A | No. 29A | No. 30A | No. 31A |
| Step 1 Pretreatment | Substrate | Cold-rolled steel panel | Cold-rolled steel panel | Cold-rolled steel panel | Cold-rolled steel panel | old-rolled steel panel | Cold-rolled steel panel |
|  | Degreasing | FINECLEANER L4460 | FINECLEANER L4460 | FINECLEANER L4460 | FINECLEANER L4460 | FINECLEANER L4460 | FINECLEANER L4460 |
|  | Surface conditioning | PREPAREN 4040N | PREPAREN 4040N | PREPAREN 4040N | PREPAREN 4040N | PREPAREN 4040N | PREPAREN 4040N |
|  | Chemical conversion treatment agent | A | A | A | A | B | B |
|  | Water washing | Yes | Yes | Yes | Yes | Yes | Yes |
| Step 2 Electro-deposition | Electrodeposition coating composition | No. 3A | No. 5A | No. 7A | No. 8A | No. 1A | No. 11A |
|  | Voltage (V) | 250 | 250 | 250 | 250 | 250 | 250 |
|  | Sec | 180 | 180 | 180 | 180 | 180 | 180 |
| Step 3 | Drying (170° C.) | 20 min | 20 min | 20 min | 20 min | 20 min | 20 min |
| Corrosion resistance | (Note 15A) | A | A | A | B | A | A |
| Weathering resistance | (Note 16A) | A | A | A | B | A | A |
| Finish | (Note 17A) | B | B | B | B | B | B |

Note 15A

Corrosion resistance: The electrodeposition coating film on each test panel was cross-cut with a knife to a depth reaching the substrate, and the test panel was subjected to a salt spray resistance test for 480 hours in accordance with JIS Z-2371. Corrosion resistance was evaluated according to the following criteria based on the width of rusting and blistering from the knife cut:

A: the maximum width of rusting and blistering from the cut was less than 2 mm (single side);

B: the maximum width of rusting and blistering from the cut was not less than 2 mm and less than 3 mm (single side);

C: the maximum width of rusting and blistering from the cut was not less than 3 mm and less than 4 mm (single side); and D: the maximum width of rusting and blistering from the cut was not less than 4 mm (single side).

Note 16A

Weathering resistance: Each test panel was spray-coated with WP-300 (water-based intermediate coating composition from Kansai Paint Co., Ltd.) to a cured film thickness of 25 μm and baked at 140° C. for 30 min in an electric hot air dryer. Onto the intermediate coating was further applied NEO AMILAC 6000 (top coating composition from Kansai Paint Co., Ltd.) by spray coating to a cured film thickness of 35 μm, and then baked at 140° C. for 30 min in an electric hot air dryer, to obtain a weathering test panel.

The coating film on each weathering test panel obtained was cross-cut with a knife to a depth reaching the substrate, and the panel was placed horizontally for one-year weathering in Chikura-cho, Chiba Prefecture, Japan. Weathering resistance was evaluated according to the following criteria based on the width of rusting and blistering from the knife cut:

A: the maximum width of rusting and blistering from the cut was less than 2 mm (single side);

B: the maximum width of rusting and blistering from the cut was not less than 2 mm and less than 3 mm (single side);

C: the maximum width of rusting and blistering from the cut was not less than 3 mm and less than 4 mm (single side); and D: the maximum width of rusting and blistering from the cut was not less than 4 mm (single side).

Note 17A

Finish: Surface roughness (Ra) of the coating surface of each test panel was measured with a SurfTest 301 (roughness tester from Mitutoyo Corporation) at a cutoff of 0.8 mm, and evaluated according to the following criteria:

A: the surface roughness (Ra) was less than 0.2;

B: the surface roughness (Ra) was not less than 0.2 and less than 0.25;

C: the surface roughness (Ra) was not less than 0.25 and less than 0.3; and

D: the surface roughness (Ra) was not less than 0.3.

Production Example 1B

Amino Group-Containing Epoxy Resin Solution No. 1B

In a separable flask with an inner volume of 2 l equipped with a thermometer, reflux condenser and stirrer, 708 parts of jER1001 (epoxy resin from Japan Epoxy Resins Co., Ltd.) and 250 parts of ethylene glycol monobutyl ether were added; 83 parts of diethanolamine and 209 parts of a ketimine of diethylenetriamine with methyl isobutyl ketone were added; and the resultant mixture was allowed to react at 110° C. for 4 hours to obtain amino group-containing epoxy resin solution No. 1B having a resin solid content of 80 mass %. The resin solids of the amino group-containing epoxy resin solution No. 1B had an amine number of 130 mgKOH/g and a number average molecular weight of 1,300.

Production Example 2B

Emulsion No. 1B 125 parts (solid content: 100 parts) of the 80% amino group-containing epoxy resin solution No. 1B obtained in Production Example 1B and 16.4 parts of 10% formic acid were blended and stirred to uniformity, and then 860 parts of deionized water was added dropwise over about 15 min under vigorous stirring to obtain emulsion No. 1 having a solid content of 10%.

Production Example 3B

Coating Film Forming Agent No. 1

One thousand parts of deionized water was added to 2.7 parts of ammonium zirconium fluoride, followed by addition of 1,000 parts (solid content: 100 parts) of emulsion No. 1B having a solid content of 10%, thereby obtaining coating film forming agent No. 1B. The pH of coating film forming agent No. 1B was 6.5.

Production Examples 4B to 15B

Coating Film Forming Agents No. 2B to No. 13B

Coating film forming agents No. 2B to No. 13B were obtained in the manner of Production Example 3B except that the formulations and the pH of the coating film forming agent were as shown in Table 1B.

TABLE 1B

| | | Prod. Ex. 3B | Prod. Ex. 4B | Prod. Ex. 5B | Prod. Ex. 6B | Prod. Ex. 7B | Prod. Ex. 8B | Prod. Ex. 9B |
|---|---|---|---|---|---|---|---|---|
| Formulation | Coating film forming agent | No. 1B | No. 2B | No. 3B | No. 4B | No. 5B | No. 6B | No. 7B |
| | Ammonium zirconium fluoride | 2.7 | 2.7 | 2.7 | 2.7 | 2.7 | 2.7 | 2.7 |
| | Ammonium titanium fluoride | | 0.8 | | | | | |
| | Cobalt nitrate hexahydrate | | | 1.0 | | | | |
| | Aluminum nitrate nonahydrate | | | | 2.8 | | | |
| | Zinc nitrate hexahydrate | | | | | 0.9 | | |
| | Yttrium nitrate hexahydrate | | | | | | 0.9 | |
| | Deionized water | 1000 | 1000 | 1000 | 1000 | 1000 | 1000 | 2000 |
| | Emulsion No. 1 | 1000 (100) | 1000 (100) | 1000 (100) | 1000 (100) | 1000 (100) | 1000 (100) | |
| | K-90W (Note 1B) | | | | | | | |
| | K-17C (Note 2B) | | | | | | | |
| PH of coating film forming agent | | 6.5 | 6.0 | 6.5 | 6.5 | 6.4 | 6.1 | 4.5 |

| | | Prod. Ex. 10B | Prod. Ex. 11B | Prod. Ex. 12B | Prod. Ex. 13B | Prod. Ex. 14B | Prod. Ex. 15B |
|---|---|---|---|---|---|---|---|
| Formulation | Coating film forming agent | No. 8B | No. 9B | No. 10B | No. 11B | No. 12B | No. 13B |
| | Ammonium zirconium fluoride | 2.7 | 2.7 | 2.7 | 2.7 | 2.7 | 2.7 |
| | Ammonium titanium fluoride | | 0.8 | | | 0.8 | |
| | Cobalt nitrate hexahydrate | | | 1.0 | | | 1.0 |
| | Aluminum nitrate nonahydrate | | | | | | |
| | Zinc nitrate hexahydrate | | | | | | |
| | Yttrium nitrate hexahydrate | | | | | | |
| | Deionized water | 1500 | 1500 | 1500 | 1500 | 1500 | 1500 |
| | Emulsion No. 1 | | | | | | |
| | K-90W (Note 1B) | 500 (100) | 500 (100) | 500 (100) | | | |
| | K-17C (Note 2B) | | | | 500 (100) | 500 (100) | 500 (100) |
| PH of coating film forming agent | | 4.5 | 4.5 | 4.5 | 4.5 | 4.5 | 4.5 |

The parenthesized numerals in the formulation indicate solid contents.
Note 1B
K-90W: trade name of polyvinylpyrrolidone solution having a solid content of 20%, produced by Nihon Shokubai Co.
Note 2B
K-17C: Trade name of polyvinyl alcohol solution having a solid content of 20%, produced by Denki Kagaku Kogyo Kabushiki Kaisha

Production Example 16B

Amino Group-Containing Epoxy Resin Solution No. 2B

To 845 parts of jER1002 (epoxy resin from Japan Epoxy Resins Co., Ltd.), 250 parts of ethylene glycol monobutyl ether, 103 parts of diethanolamine and 52 parts of a ketimine of diethylenetriamine with methyl isobutyl ketone were added, and the resultant mixture was allowed to react at 120° C. for 4 hours to obtain amino group-containing epoxy resin solution No. 2B having a resin solid content of 80%. The resin solids of amino group-containing epoxy resin solution No. 2B had an amine number of 77 mgKOH/g and a number average molecular weight of 1,600.

Production Example 17B

Amino Group-Containing Epoxy Resin Solution No. 3B

Three hundred parts of ε-caprolactone was added to 400 parts of PP-400 (trade name of polypropylene glycol, molecular weight 400, produced by Sanyo Chemical Industries, Ltd.), and the temperature was raised to 130° C. Next, 0.01 part of tetrabutoxytitanium was added, and the temperature was raised to 170° C. With this temperature maintained, sampling was performed over the course of time to monitor the amount of unreacted ε-caprolactone by infrared absorption spectral analysis. Upon ascertaining that substantially no unreacted ε-caprolactone remained, the solution was cooled to obtain a modifier.

Separately, 400 parts of bisphenol A and 0.2 part of dimethylbenzylamine were added to 1,000 parts of jER828EL (trade name of epoxy resin produced by Epoxy Resin Co.), and the resultant mixture was allowed to react at 130° C. until the epoxy equivalent reached 750.

Then, 120 parts of nonyphenol was added and the reaction was continued at 130° C. until the epoxy equivalent reached 1,000. Next, 200 parts of the modifier, 95 parts of diethanolamine and 65 g of a ketimine of diethylenetriamine were added. After reacting at 120° C. for 4 hours, the product was diluted with ethylene glycol monobutyl ether to obtain nonylphenol-added, polyol-modified amino group-containing epoxy resin solution No. 3B having a solid resin content of 80%. The resin solids of amino group-containing epoxy resin No. 3B had a resin amine value of 40 mgKOH/g and a number average molecular weight of 2,000.

Production Example 18B

Curing Agent No. 1B

To 222 parts of isophorone diisocyanate was added 44 parts of methyl isobutyl ketone, and the temperature was raised to 70° C. Thereafter 174 parts of methyl ethyl ketoxime was added dropwise over 2 hours. With the temperature maintained, sampling was performed over the course of time to ascertain termination of unreacted isocyanate absorption by infrared absorption spectral analysis, whereby a blocked polyisocyanate compound having a resin solid content of 90% was obtained as curing agent No. 1B.

Production Example 19B: Emulsion No. 2B 87.5 parts (solid content: 70 parts) of amino group-containing epoxy resin solution No. 2B with a resin solid content of 80% obtained in Production Example 16B, 33.3 parts (solid content: 30.0 parts) of curing agent No. 1B obtained in Production Example 18B, and 10.7 parts of 10% formic acid were blended and stirred to uniformity, and then 181 parts of deionized water was added dropwise over about 15 min under vigorous stifling to obtain emulsion No. 2B having a solid content of 32.0%.

Production Example 20B

Emulsion No. 3B having a solid content of 32.0% was obtained in the manner of Production Example 19B except for using amino group-containing epoxy resin solution No. 3B with a resin solid content of 80% obtained in Production Example 17B.

Production Example 21B

Pigment Dispersing Resin

To 1,010 parts of jER828EL (trade name of epoxy resin produced by Epoxy Resin Co.) were added 390 parts of bisphenol A, 240 parts of PLACCEL 212 (trade name of polycaprolactonediol having a weight average molecular weight of about 1,250, produced by Daicel Chemical Industries), and 0.2 part of dimethylbenzylamine, and the resultant mixture was allowed to react at 130° C. until the epoxy equivalent reached about 1,090.

Next, 134 parts of dimethylethanolamine and 150 parts of aqueous solution of lactic acid of 90% concentration were added and the resultant mixture was allowed to react at 120° C. for 4 hours. The solid content was then adjusted by addition of methyl isobutyl ketone to obtain an ammonium salt resin-based pigment dispersing resin having a solid content of 60%.

Production Example 22B

Pigment-Dispersed Paste No. 1B 8.3 parts (solid content: 5.0 parts) of the pigment dispersing resin having a solid content of 60% obtained in Production Example 21B, 14.0 parts (solid content: 14.0 parts) of JR-600E (Note 3B), 0.3 part (solid content: 0.3 part) of Carbon MA-7 (Note 4B), 9.7 parts (solid content: 9.7 parts) of Hydrite PXN (Note 5B), 1.0 part (solid content: 1.0 part) of dioctyltin oxide, and 23.3 parts of deionized water were blended and dispersed to obtain pigment-dispersed paste No. 1B having a solid content of 55 mass %.

Production Example 23B

Pigment-Dispersed Paste No. 2B

Pigment-dispersed paste No. 2B was obtained in the manner of Production Example 22B except that the formulation was as shown in Table 2B.

TABLE 2B

|  |  | Prod. Ex. 22B | Prod. Ex. 23B |
|---|---|---|---|
| Pigment-dispersed paste |  | No. 1B | No. 2B |
| Dispersing resin | Pigment dispersing resin solution | 6.3 (5.0) | 6.3 (5.0) |
| Coloring pigment | JR-600E (Note 3B) | 14.0 (14.0) | 14.0 (14.0) |
|  | Carbon MA-7 (Note 4B) | 0.3 (0.3) | 0.3 (0.3) |
| Extender pigment | Hydrite PXN (Note 5B) | 9.7 (9.7) | 9.7 (9.7) |
| Tin catalyst | Dioctyltin oxide | 1.0 (1.0) | — |
|  | Deionized water | 23.3 | 22.5 |
|  | 55% Pigment-dispersed paste | 54.5 (30.0) | 52.7 (29.0) |

The parenthesized numerals indicate solid contents.
Note 3B
JR-600E: trade name of titanium white produced by Tayca Corporation
Note 4B
Carbon MA-7: trade name of carbon black produced by Mitsubishi Chemical Co.
Note 5B
Hydrite PXN: trade name of kaolin produced by Georgia Kaolin Co.

Production Example 24B 312.5 parts (solid content: 100.0 parts) of emulsion No. 2B having a solid content of 32%, 54.5 parts (solid content: 30.0 parts) of the 55% pigment-dispersed paste No. 1B obtained in Production Example 21B, and 283.0 parts of deionized water were blended to form a bath having a solid content of 20%, thereby obtaining coating film forming agent No. 14B.

Production Examples 25B and 26B

Coating film forming agents No. 15B and No. 16B were obtained in the manner of Production Example 22B except that the formulations were as shown in Table 3B.

TABLE 3B

|  | Prod. Ex. 24B | Prod. Ex. 25B | Prod. Ex. 26B |
|---|---|---|---|
| Coating film forming agent | No. 14B | No. 15B | No. 16B |
| Emulsion No. 2B | 312.5 (100.0) | — | — |
| Emulsion No. 3B | — | 312.5 (100.0) | 312.5 (100.0) |
| Pigment-dispersed paste No. 1B | 54.5 (30.0) | 54.5 (30.0) | — |
| Pigment-dispersed paste No. 2B | — | — | 52.7 (29.0) |
| Deionized water | 283.0 | 283.0 | 279.8 |
| 20% bath | 650.0 (130.0) | 650.0 (130.0) | 645.0 (129.0) |

Coating Film Formation by Immersion in First Tank and Application of Electric Current Example 1B Test panel No. 1B was obtained by the following Steps 1 to 3.

Step 1: A cold-rolled steel panel (70 mm×150 mm×0.8 mm) was treated by immersion at 40° C. for 2 min in 2-mass % FINECLEANER L4460 (from Nihon Parkerizing Co.) and then washed with tap water for 30 sec to obtain a test panel. The test panel was immersed as a cathode (inter-electrode distance: 15 cm) in a bath of coating film forming agent No. 1B adjusted to 40° C., and electric current was applied at 5 V for 60 sec.

Step 2: The test panel obtained in Step 1 was withdrawn and, without water washing, immersed in a bath of coating film forming agent No. 14B adjusted to 28° C., and electric current was applied at 260 V (voltage rise period: 30 sec) for 120 sec.

Step 3: The obtained coating film was washed and baked at 170° C. for 20 min in an electric drier.

Examples 2B to 18B

Test panels No. 2B to No. 18B were obtained in the manner of Example 1B except that the coating film forming agents. and coating conditions shown in Tables 4B and 5B were used.

Example 19B

Test panel No. 19B was obtained by the following Steps 1 to 3.

Step 1: A cold-rolled steel panel (70 mm×150 mm×0.8 mm) was treated by immersion at 40° C. for 2 min in 2-mass % FINECLEANER L4460 (from Nihon Parkerizing Co.) and then washed with tap water for 30 sec to obtain a test panel. The test panel was immersed as a cathode (inter-electrode distance: 15 cm) in a bath of coating film forming agent No. 1B adjusted to 40° C., and electric current was applied at 5 V for 60 sec. The obtained test panel was withdrawn and, without water washing, air-blown at 35° C. for 10 min.

Step 2: The test panel was then immersed in a bath of coating film forming agent No. 14B adjusted to 28° C., and electric current was applied at 260 V (voltage rise period: 30 sec) for 120 sec.

Step 3: The obtained coating film was washed and baked at 170° C. for 20 min in an electric drier.

TABLE 4B

|  |  | Ex. 1B | Ex. 2B | Ex. 3B | Ex. 4B | Ex. 5B | Ex. 6B | Ex. 7B | Ex. 8B | Ex. 9B | Ex. 10B |
|---|---|---|---|---|---|---|---|---|---|---|---|
| Step 1 First layer | Test panel | No. 1B | No. 2B | No. 3B | No. 4B | No. 5B | No. 6B | No. 7B | No. 8B | No. 9B | No. 10B |
|  | Substrate | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel |
|  | Coating film forming agent | No. 1B | No. 1B | No. 1B | No. 1B | No. 1B | No. 2B | No. 3B | No. 4B | No. 5B | No. 6B |
|  | Voltage (V) | 5 | 15 | 5 | 15 | 15 | 5 | 5 | 5 | 5 | 5 |
|  | Sec | 60 | 60 | 60 | 60 | 60 | 60 | 60 | 60 | 60 | 60 |
| Air blowing | ° C. | No | No | No | No | No | No | No | No | No | No |
|  | Sec |  |  |  |  |  |  |  |  |  |  |

TABLE 4B-continued

|  |  | Ex. 1B | Ex. 2B | Ex. 3B | Ex. 4B | Ex. 5B | Ex. 6B | Ex. 7B | Ex. 8B | Ex. 9B | Ex. 10B |
|---|---|---|---|---|---|---|---|---|---|---|---|
| Step 2 Second layer | Coating film forming agent | No. 14B | No. 14B | No. 15B | No. 15B | No. 16B | No. 14B | No. 14B | No. 14B | No. 14B | No. 14B |
|  | Voltage (V) | 260 | 260 | 260 | 260 | 260 | 260 | 260 | 260 | 260 | 260 |
|  | Sec | 120 | 120 | 120 | 120 | 120 | 120 | 120 | 120 | 120 | 120 |
| Step 3 | Drying (170° C.) | 20 min | 20 min | 20 min | 20 min | 20 min | 20 min | 20 min | 20 min | 20 min | 20 min |
| Corrosion resistance (Note 6B) |  | B | B | A | A | B | B | B | B | B | B |
| Weathering resistance (Note 7B) |  | B | A | A | A | B | B | B | B | B | B |
| Finish (Note 8B) |  | B | B | A | A | A | B | B | B | B | B |

TABLE 5B

|  |  |  | Ex. 11B | Ex. 12B | Ex. 13B | Ex. 14B | Ex. 15B | Ex. 16B | Ex. 17B | Ex. 18B | Ex. 19B |
|---|---|---|---|---|---|---|---|---|---|---|---|
|  | Test panel |  | No. 11B | No. 12B | No. 13B | No. 14B | No. 15B | No. 16B | No. 17B | No. 18B | No. 19B |
| Step 1 First layer | Substrate |  | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel |
|  | Coating film forming agent |  | No. 8B | No. 8B | No. 9B | No. 10B | No. 10B | No. 11B | No. 12B | No. 13B | No. 1B |
|  | Voltage (V) |  | 5 | 15 | 5 | 5 | 5 | 15 | 5 | 5 | 5 |
|  | Sec |  | 60 | 60 | 60 | 60 | 60 | 60 | 60 | 60 | 60 |
| Air blowing | ° C. |  | No | No | No | No | No | No | No | No | 35 |
|  | Sec |  |  |  |  |  |  |  |  |  | 10 |
| Step 2 Second layer | Coating film forming agent |  | No. 14B | No. 14B | No. 14B | No. 14B | No. 14B | No. 14B | No. 14B | No. 14B | No. 14B |
|  | Voltage (V) |  | 260 | 260 | 260 | 260 | 260 | 260 | 260 | 260 | 260 |
|  | Sec |  | 120 | 120 | 120 | 120 | 120 | 120 | 120 | 120 | 120 |
| Step 3 | Drying (170° C.) |  | 20 min | 20 min | 20 min | 20 min | 20 min | 20 min | 20 min | 20 min | 20 min |
| Corrosion resistance | (Note 6B) |  | B | B | B | B | B | B | B | B | B |
| Weathering resistance | (Note 7B) |  | B | A | B | B | B | A | B | B | B |
| Finish | (Note 8B) |  | B | B | B | B | B | B | B | B | A |

Coating Film Formation by Immersion in First Tank Without Applying Electric Current Example 20B Test panel No. 20B was obtained by the following Steps 1 to 3.

Step 1: A cold-rolled steel panel (70 mm×150 mm×0.8 mm) was treated by immersion at 40° C. for 2 min in 2-mass % FINECLEANER L4460 (from Nihon Parkerizing Co.), washed with tap water for 30 sec, and immersed for 120 sec in a bath of coating film forming agent No. 1B adjusted to 40° C.

Step 2: The test panel obtained in Step 1 was withdrawn and, without water washed, immersed in a bath of coating film forming agent No. 14B adjusted to 28° C., and electric current was applied at 260 V (voltage rise period: 30 sec) for 150 sec.

Step 3: The obtained coating film was washed with water and baked at 170° C. for 20 min in an electric drier.

Examples 21B to 26B

Test panels No. 21B to No. 26B were obtained in the manner of Example 20B except that the coating film forming agents and coating conditions shown in Table 6B were used.

TABLE 6B

|  |  |  | Ex. 20B | Ex. 21B | Ex. 22B | Ex. 23B | Ex. 24B | Ex. 25B | Ex. 26B |
|---|---|---|---|---|---|---|---|---|---|
|  | Test panel |  | No. 20B | No. 21B | No. 22B | No. 23B | No. 24B | No. 25B | No. 26B |
| Step First layer | Substrate |  | Cold-rolled steel panel | Cold-rolled steel panel | Cold-rolled steel panel | Cold-rolled steel panel | Cold-rolled steel panel | Cold-rolled steel panel | Cold-rolled steel panel |
|  | Coating film forming agent |  | No. 1B | No. 1B | No. 2B | No. 3B | No. 7B | No. 10B | No. 1B |

TABLE 6B-continued

|  |  | Ex. 20B | Ex. 21B | Ex. 22B | Ex. 23B | Ex. 24B | Ex. 25B | Ex. 26B |
|---|---|---|---|---|---|---|---|---|
|  | Sec | 120 | 120 | 120 | 180 | 180 | 180 | 120 |
| Air-blowing | ° C. | No | No | No | No | No | No | 35 |
|  | Sec |  |  |  |  |  |  | 10 |
| Step 2 Second layer | Coating film forming agent | No. 14B | No. 15B | No. 14B | No. 14B | No. 14B | No. 14B | No. 14B |
|  | Voltage (V) | 260 | 260 | 260 | 260 | 260 | 260 | 260 |
|  | Sec | 150 | 150 | 150 | 150 | 150 | 150 | 150 |
| Step | Drying (170° C.) | 20 min | 20 min | 20 min | 20 min | 20 min | 20 min | 20 min |
| Corrosion resistance | (Note 6B) | B | B | B | B | B | B | B |
| Weathering resistance | (Note 7B) | B | B | B | B | B | B | B |
| Finish | (Note 8B) | B | A | B | B | B | B | A |

Comparative Example 1B

A cold-rolled steel panel (70 mm×150 mm×0.8 mm) was treated by immersion at 40° C. for 2 min in 2-mass % FINECLEANER L4460 (from Nihon Parkerizing Co.) and washed with tap water for 30 sec to obtain a test panel.

Next, the test panel was immersed as a cathode (interelectrode distance: 15 cm) in a bath of coating film forming agent No. 1B adjusted to 40° C., and electric current was applied at 5 V (voltage rise period: 30 sec) for 120 sec. The obtained coating film was then baked at 170° C. for 20 min in an electric drier to obtain test panel No. 27B having a dry film with a thickness of about 1 μm.

Comparative Example 2B

Test panel No. 28B was obtained in the manner of Comparative Example 1 except that the steps were as shown in Table 7B.

Comparative Example 3B

A cold-rolled steel panel (70 mm×150 mm×0.8 mm) was treated by immersion at 40° C. for 2 min in 2-mass % FINECLEANER L4460 (from Nihon Parkerizing Co.) and washed with tap water for 30 sec to obtain a test panel.

Next, the test panel was immersed as a cathode (interelectrode distance: 15 cm) in a bath of coating film forming agent No. 1B adjusted to 40° C. for 120 sec. The obtained coating film was then baked at 170° C. for 20 min in an electric drier to obtain a test panel No. 29B having a dry film with a thickness of about 1 μm.

Comparative Example 4B

Test panel No. 30B was obtained in the manner of Comparative Example 3 except that the steps were as shown in Table 7B.

Comparative Example 5B

A cold-rolled steel panel (70 mm×150 mm×0.8 mm) was treated by immersion at 40° C. for 2 min in 2-mass % FINECLEANER L4460 (from Nihon Parkerizing Co.) and washed with tap water for 30 sec to obtain a test panel.

Next, the test panel was immersed as a cathode (interelectrode distance: 15 cm) in a bath of coating film forming agent No. 14B adjusted to 28° C., and electric current was applied at 260 V (voltage rise period: 30 sec) for 150 sec to obtain a coating film. The obtained coating film was then baked at 170° C. for 20 min in an electric drier to obtain a test panel No. 31B having a dry film with a thickness of about 20 μm.

Comparative Examples 6B and 7B

Test panels No. 32B and No. 33B were obtained in the manner of Comparative Example 5B except that the steps were as shown in Table 7B.

Comparative Example 8B

Test panel No. 34B was obtained by the following Steps 1 to 3.

Step 1: A cold-rolled steel panel (70 mm×150 mm×0.8 mm) was treated by immersion at 40° C. for 2 min in 2-mass % FINECLEANER L4460 (from Nihon Parkerizing Co.) and then washed with tap water for 30 sec to obtain a test panel.

Using Palbond #3020 (phosphate treatment agent from Nihon Parkerizing Co.) as the coating film forming agent in the first tank, the test panel was immersed at 40° C. for 120 sec.

Step 2: The test panel obtained in Step 1 was immersed in a bath of coating film forming agent No 14B adjusted to 28° C., and electric current was applied at 260 V (voltage rise period: 30 sec) for 150 sec.

Step 3: The obtained coating film was washed and baked at 170° C. for 20 min in an electric drier.

Comparative Example 9B

Test panel No. 35B was obtained in the manner of Comparative Example 8B except that the steps were as shown in Table 7B.

Comparative Example 10B

Test panel No. 36B was obtained by the following Steps 1 to 3.

Step 1: A cold-rolled steel panel (70 mm×150 mm×0.8 mm) was treated by immersion at 40° C. for 2 min in 2-mass % FINECLEANER L4460 (from Nihon Parkerizing Co.) and then washed with tap water for 30 sec to obtain a test panel. Next, the test panel was immersed as a cathode (inter-electrode distance: 15 cm) in a bath of coating film forming agent No. 1 adjusted to 40° C., and electric current was applied at 5 V (voltage rise period: 30 sec) for 60 sec.

The test panel obtained in Step 1 was washed with water.

Step 2: The test panel was then immersed in a bath of coating film forming agent No. 14B adjusted to 28° C., and electric current was applied at 260 V (voltage rise period: 30 sec) for 120 sec.

Step 3: The obtained coating film was washed with water and baked at 170° C. for 20 min in an electric drier.

Comparative Example 11B

Test panel No. 37B was obtained in the manner of Comparative Example 10B except that the steps were as shown in Table 7B.

Example 1C

Test panel No. 1C was obtained by the following Steps 1 to 3.

Step 1: A cold-rolled steel panel (70 mm×150 mm×0.8 mm) was treated by immersion at 40° C. for 2 min in 2-mass % FINECLEANER L4460 (from Nihon Parkerizing Co.) and then washed with tap water for 30 sec to obtain a test panel. The test panel was immersed as a cathode (inter-electrode distance: 15 cm) in a bath of coating film forming agent No. 1B adjusted to 40° C., and electric current was applied at 5 V for 60 sec.

Step 2 (electrodeposition coating): The panel was immersed in a bath of electrodeposition coating composition No. 1A adjusted to 28° C. and cationic electrodeposition coating was conducted at 250 V (voltage rise period: 30 sec) for 180 sec. The operations of Steps 1 and 2 were repeated until the concentration of $Zn^{2+}$ in the electrodeposition coating composition became about 0.03 g/l as measured by ICP analysis (see Note 14A), whereupon the panel was transferred to Step 3.

TABLE 7B

|  |  | Comp. Ex. 1B | Comp. Ex. 2B | Comp. Ex. 3B | Comp. Ex. 4B | Comp. Ex. 5B | Comp. Ex. 6B | Comp. Ex. 7B | Comp. Ex. 8B | Comp. Ex. 9B | Comp. Ex. 10B | Comp. Ex. 11B |
|---|---|---|---|---|---|---|---|---|---|---|---|---|
|  | Test panel | No. 27B | No. 28B | No. 29B | No. 30B | No. 31B | No. 32B | No. 33B | No. 34B | No. 35B | No. 36B | No. 37B |
| Step 1 Application of electric current or immersion | Substrate | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel |
|  | Coating film forming agent | No. 1 | No. 1 | No. 1 | No. 7 |  |  |  | Phosphate bath | Phosphate bath | No. 1 | Phosphate bath |
|  | Voltage (V) | 5 | 250 | Immersion only | Immersion only |  |  |  | Immersion only | Immersion only | 5 | Immersion only |
|  | Sec | 120 | 210 | 120 | 120 |  |  |  | 120 | 120 | 60 | 120 |
|  | Water washing |  |  |  |  |  |  |  |  |  | Yes | Yes |
| Step 2 | Coating film forming agent |  |  |  | No. 14 | No. 14 | No. 15 | No. 16 | No. 14 | No. 15 | No. 14 | No. 14 |
|  | Voltage (V) |  |  |  | 260 | 260 | 260 | 260 | 260 | 260 | 260 | 260 |
|  | Sec |  |  |  | 150 | 150 | 150 | 150 | 150 | 150 | 120 | 150 |
| Step 3 | Drying (170° C.) | 20 min | 20 min | 20 min | 20 min | 20 min | 20 min | 20 min | 20 min | 20 min | 20 min | 20 min |
|  | Corrosion resistance (Note 6B) | D | D | D | C | D | D | D | B | B | B | B |
|  | Weathering resistance (Note 7B) | D | D | D | C | D | D | D | C | C | B | B |
|  | Finish (Note 8B) | C | C | C | C | B | B | B | C | C | B | B |

Note 6B
Corrosion resistance: The electrodeposition coating was cross-cut with a knife to a depth reaching the substrate and the test panel was subjected to a salt spray resistance test for 480 hours in accordance with JIS Z-2371. Corrosion resistance was evaluated according to the following criteria based on the width of rusting and blistering from the knife cut:
A: the maximum width of rusting and blistering from the cut was less than 2 mm (single side);
B: the maximum width of rusting and blistering from the cut was not less than 2 mm and less than 3 mm (single side);
C: the maximum width of rusting and blistering from the cut was not less than 3 mm and less than 4 mm (single side); and
D: the maximum width of rusting and blistering from the cut was not less than 4 mm (single side).

Note 7B
Weathering resistance: Each test panel was spray-coated with WP-300 (water-based intermediate coating composition from Kansai Paint Co., Ltd.) to a cured film thickness of 25 μm and baked at 140° C. for 30 min in an electric hot air dryer. Onto the intermediate coating was further applied NEO AMILAC 6000 (top coating composition from Kansai Paint Co., Ltd.) by spray coating to a cured film thickness of 35 μm, and then baked at 140° C. for 30 min in an electric hot air dryer, to obtain a weathering test panel.
The coating film on each weathering test panel obtained was cross-cut with a knife to a depth reaching the substrate, and the panel was placed horizontally for one-year weathering in Chikura-cho, Chiba Prefecture, Japan. Weathering resistance was evaluated according to the following criteria based on the width of rusting and blistering from the knife cut:
A: the maximum width of rusting and blistering from the cut was less than 2 mm (single side),
B: the maximum width of rusting and blistering from the cut was not less than 2 mm and less than 3 mm (single side),
C: the maximum width of rusting and blistering from the cut was not less than 3 mm and less than 4 mm (single side), and
D: the maximum width of rusting and blistering from the cut was not less than 4 mm (single side).

Note 8B
Finish: Surface roughness (Ra) of the coating surface of each test panel was measured with a SurfTest 301 (roughness tester from Mitutoyo Corporation) at a cutoff of 0.8 mm, and evaluated according to the following criteria:
A: the surface roughness (Ra) was less than 0.2;
B: the surface roughness (Ra) was not less than 0.2 and less than 0.25;
B: the surface roughness (Ra) was not less than 0.25 and less than 0.3;, and
C: the surface roughness (Ra) was not less than 0.3.

Step 3 (baking and drying): Baking was conducted for 20 min at 170° C. in an electric drier to obtain a dry film thickness of 20 μm.

Examples 2C to 10C

Test panels No. 2C to No. 10C were obtained in the manner of Example 1C except that the electrodeposition coating compositions and coating conditions shown in Table 1C were adopted.

TABLE 1C

|  |  | Ex. 1C | Ex. 2C | Ex. 3C | Ex. 4C | Ex. 5C | Ex. 6C | Ex. 7C | Ex. 8C | Ex. 9C | Ex. 10C |
|---|---|---|---|---|---|---|---|---|---|---|---|
| Step 1 First layer | Test panel | No. 1C | No. 2C | No. 3C | No. 4C | No. 5C | No. 6C | No. 7C | No. 8C | No. 9C | No. 10C |
|  | Substrate | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel | Cold-rolled steel panel |
|  | Coating film forming agent | No. 1B | No. 1B | No. 1B | No. 1B | No. 1B | No. 1B | No. 1B | No. 1B | No. 1B | No. 1B |
|  | Voltage (V) | 5 | 5 | 5 | 5 | 5 | 5 | 5 | 5 | 5 | 5 |
|  | Sec | 60 | 60 | 60 | 60 | 60 | 60 | 60 | 60 | 60 | 60 |
| Air blowing or water washing | ° C. | No | No | No | No | No | No | No | No | No | No |
|  | Sec |  |  |  |  |  |  |  |  |  |  |
| Step 2 Second layer | Electrodeposition coating composition | No. 1A | No. 2A | No. 3A | No. 4A | No. 5A | No. 6A | No. 7A | No. 8A | No. 9A | No. 10A |
|  | Voltage (V) | 260 | 260 | 260 | 260 | 260 | 260 | 260 | 260 | 260 | 260 |
|  | Sec | 120 | 120 | 120 | 120 | 120 | 120 | 120 | 120 | 120 | 120 |
| Step 3 | Drying (170° C.) | 20 min | 20 min | 20 min | 20 min | 20 min | 20 min | 20 min | 20 min | 20 min | 20 min |
| Corrosion resistance | (Note 6B) | A | B | A | B | A | B | A | B | A | B |
| Weathering resistance | (Note 7B) | A | B | A | B | A | B | A | B | A | B |
| Finish | (Note 8B) | B | B | B | B | B | B | B | B | A | B |

The invention claimed is:

1. A method for forming a multilayer coating film in a coating line comprising a chemical conversion treatment coating film (F1) and an electrodeposition coating film (F2), the method comprising the following steps:

Step 1: immersing a metal substrate in a coating film forming agent (1) comprising a zirconium compound as a chemical conversion coating solution to form a chemical conversion coating film (F1); and Step 2: without water washing, electrodepositing a coating film forming agent (2) as a cationic electrodeposition coating composition (I) onto the metal substrate to form an electrodeposition coating film (F2), wherein the cationic electrodeposition coating composition (I) contains 40 to 80 mass % of an amino group-containing modified epoxy resin (A) based on the total solid content of the resin component constituting the cationic electrodeposition coating composition, and the amino group-containing modified epoxy resin (A) contains 3 to 50 mass % of a poly (oxyalkylene) chain represented by Formula (1) based on the resin content of the resin (A)

(1)

where Rs in the b-number of repeating units may be the same or different, each R represents a hydrogen atom or a $C_{1-6}$ alkyl group, a represents an integer from 1 to 8, and b represents an integer from 1 to 50, and wherein the amino group-containing modified epoxy resin (A) is produced by reacting an epoxy resin (a2) having an epoxy equivalent of 170 to 500 and a bisphenol (a3) with at least one poly(oxyalkylene)compound (a1) selected from the group consisting of poly(oxyalkylene) diglycidyl ethers (a13), at a ratio of 5 to 30 mass % of the compound (a1), 15 to 75 mass % of the epoxy resin (a2), and 20 to 50 mass % of the bisphenol (a3) based on the total solid content mass of the compound (a1), epoxy resin (a2) and bisphenol (a3), to obtain a modified epoxy resin (a4); and then reacting the modified epoxy resin (a4) with an amine compound (a5).

2. A method for forming a multilayer coating film according to claim 1, wherein the coating film forming agent (1) comprises 30 to 20,000 ppm, as a total metal quantity (on a mass basis), of the zirconium compound and/or at least one metal compound component (M) comprising a compound of at least one metal (m) selected from the group consisting of titanium, cobalt, vanadium, tungsten, molybdenum, copper, zinc, indium, bismuth, yttrium and lanthanide metals, and 0.1 to 40 mass % of a water-dispersible or water-soluble resin composition (B) relative to the coating film forming agent (1).

3. A method for forming a multilayer coating film according to claim 1, wherein the coating film forming agent (2) comprises an amino group-containing modified epoxy resin (A) and a blocked polyisocyanate, the amount of the amino group-containing modified epoxy resin (A) being 40 to 90 mass %, and the amount of the blocked polyisocyanate being 10 to 60 mass %, based on the total solid content mass of the cationic resin composition and blocked polyisocyanate.

4. A method for forming a multilayer coating film according to claim 1, wherein the cationic electrodeposition coating composition (I) contains 40 to 80 mass % of an amino group-containing modified epoxy resin (A) and 20 to 60 mass % of a blocked polyisocyanate, based on the total solid content mass of the amino group-containing modified epoxy resin (A) and blocked polyisocyanate.

5. A method for forming a multilayer coating film according to claim 1, wherein, in coating film forming equipment having in succession a coating film forming agent tank (1) and a coating film forming agent tank (2), a metal substrate is immersed in the first stage coating film forming agent tank (1) filled with a coating film forming agent (1) to form, with or without application of electric current, a coating film (F1) on the metal substrate; and without water washing, setting is performed and the metal substrate with the coating film (F1) is immersed in the second stage coating film forming agent tank (2) filled with a coating film forming agent (2) to conduct electrodeposition coating.

6. A method for forming a multilayer coating film according to claim 5, wherein the metal substrate is immersed in the first stage coating film forming agent tank (1) for 10 to 360 sec without application of electric current, and thereafter immersed in the second stage coating film forming agent tank (2) to perform electrodeposition coating at a voltage ($V_2$) of 50 to 400 V for 60 to 600 sec.

* * * * *